US011093336B2

(12) United States Patent
Vijayan

(10) Patent No.: US 11,093,336 B2
(45) Date of Patent: *Aug. 17, 2021

(54) BROWSING DATA STORED IN A BACKUP FORMAT

(71) Applicant: Commvault Systems, Inc., Tinton Falls, NJ (US)

(72) Inventor: Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,933

(22) Filed: Sep. 30, 2019

(65) Prior Publication Data

US 2020/0034241 A1 Jan. 30, 2020

Related U.S. Application Data

(60) Continuation of application No. 15/282,526, filed on Sep. 30, 2016, now Pat. No. 10,540,235, which is a
(Continued)

(51) Int. Cl.
*G06F 16/00* (2019.01)
*G06F 11/14* (2006.01)
(Continued)

(52) U.S. Cl.
CPC ...... *G06F 11/1448* (2013.01); *G06F 11/1456* (2013.01); *G06F 11/1458* (2013.01);
(Continued)

(58) Field of Classification Search
CPC .... G06F 11/1448; G06F 16/14; G06F 16/148; G06F 16/113; G06F 16/116; G06F 11/1456; G06F 11/1458
(Continued)

(56) References Cited

U.S. PATENT DOCUMENTS

| 4,394,732 A | 7/1983 | Swenson |
| 4,464,122 A | 8/1984 | Fuller et al. |

(Continued)

FOREIGN PATENT DOCUMENTS

| EP | 0259912 | 3/1988 |
| EP | 0405926 | 1/1991 |

(Continued)

OTHER PUBLICATIONS

US 10,430,280 B2, 10/2019, Vijayan (withdrawn)
(Continued)

*Primary Examiner* — Monica M Pyo
(74) *Attorney, Agent, or Firm* — Knobbe, Martens, Olson & Bear, LLP

(57) ABSTRACT

The disclosed techniques enable browsing of data items that are stored in a backup storage system in a backup format. A search query from a user is received where the search query is for a data item stored in a data storage system, such as a tape drive, a disk array, or a cloud-based storage system. The system may use an index to look up a data format of the data item. To present the data to the user, the system may perform a restoration operation using two or more staging operations to convert the data format to a format that can be presented to the user.

16 Claims, 13 Drawing Sheets

Related U.S. Application Data division of application No. 13/793,210, filed on Mar. 11, 2013, now Pat. No. 9,459,968.

(51) Int. Cl.
*G06F 16/14* (2019.01)
*G06F 16/11* (2019.01)

(52) U.S. Cl.
CPC .......... *G06F 16/113* (2019.01); *G06F 16/116* (2019.01); *G06F 16/14* (2019.01); *G06F 16/148* (2019.01); *G06F 2201/84* (2013.01)

(58) Field of Classification Search
USPC .................. 707/638, 639, 644, 646, 647
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos |
| 5,410,700 A | 4/1995 | Fecteau et al. |
| 5,448,718 A | 9/1995 | Cohn |
| 5,448,724 A | 9/1995 | Hayashi et al. |
| 5,450,592 A | 9/1995 | McLeod |
| 5,485,606 A | 1/1996 | Midgdey |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai |
| 5,544,345 A | 8/1996 | Carpenter et al. |
| 5,544,347 A | 8/1996 | Yanal et al. |
| 5,555,371 A | 9/1996 | Duyanovish |
| 5,559,957 A | 9/1996 | Balk |
| 5,564,037 A | 10/1996 | Lam |
| 5,608,865 A | 3/1997 | Midgely |
| 5,613,134 A | 3/1997 | Lucus |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey |
| 5,666,501 A | 9/1997 | Jones |
| 5,673,381 A | 9/1997 | Huai et al. |
| 5,673,382 A | 9/1997 | Cannon |
| 5,699,361 A | 12/1997 | Ding et al. |
| 5,711,010 A | 1/1998 | Naddell |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees |
| 5,872,905 A | 2/1999 | Ono et al. |
| 5,875,478 A | 2/1999 | Blumenau |
| 5,887,134 A | 3/1999 | Ebrahim |
| 5,894,585 A | 4/1999 | Inoue |
| 5,896,531 A | 4/1999 | Curtis |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,009,275 A | 12/1999 | Dekoning |
| 6,012,053 A | 1/2000 | Pant |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough |
| 6,073,128 A | 6/2000 | Pongracz |
| 6,076,148 A | 6/2000 | Kedem et al. |
| 6,091,518 A | 7/2000 | Anabuki |
| 6,094,416 A | 7/2000 | Ying |
| 6,112,304 A | 8/2000 | Clawson |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis |
| 6,212,512 B1 | 4/2001 | Barney et al. |
| 6,226,759 B1 | 5/2001 | Miller |
| 6,239,800 B1 | 5/2001 | Mayhew |
| 6,253,217 B1 | 6/2001 | Dourish |
| 6,260,069 B1 | 7/2001 | Anglin |
| 6,266,679 B1 | 7/2001 | Szalwinski |
| 6,266,784 B1 | 7/2001 | Hsiao |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii |
| 6,327,612 B1 | 12/2001 | Watanabe |
| 6,328,766 B1 | 12/2001 | Long |
| 6,330,570 B1 | 12/2001 | Crighton et al. |
| 6,330,642 B1 | 12/2001 | Carteau |
| 6,341,287 B1 | 1/2002 | Sziklai et al. |
| 6,343,287 B1 | 1/2002 | Kumar |
| 6,343,324 B1 | 1/2002 | Hubis et al. |
| 6,345,288 B1 | 2/2002 | Reed |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu |
| 6,389,432 B1 | 5/2002 | Pothapragada et al. |
| 6,418,478 B1 | 7/2002 | Ignatius |
| 6,421,678 B2 | 7/2002 | Smiga et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Eblund |
| 6,487,561 B1 | 11/2002 | Ofek et al. |
| 6,487,644 B1 | 11/2002 | Huebsch |
| 6,502,205 B1 | 12/2002 | Yanai |
| 6,519,679 B2 | 2/2003 | Devireddy et al. |
| 6,538,669 B1 | 3/2003 | Lagueux, Jr. et al. |
| 6,539,388 B1 | 3/2003 | Hattori |
| 6,540,623 B2 | 4/2003 | Jackson |
| 6,549,918 B1 | 4/2003 | Probert |
| 6,557,039 B1 | 4/2003 | Leong |
| 6,564,228 B1 | 5/2003 | O'Connor |
| 6,593,656 B2 | 7/2003 | Ahn et al. |
| 6,618,771 B1 | 9/2003 | Leja |
| 6,629,110 B2 | 9/2003 | Cane |

(56) References Cited

U.S. PATENT DOCUMENTS

| | | |
|---|---|---|
| 6,647,399 B2 | 11/2003 | Zaremba |
| 6,658,526 B2 | 12/2003 | Nguyen et al. |
| 6,662,218 B2 | 12/2003 | Mighdoll et al. |
| 6,675,177 B1 | 1/2004 | Webb |
| 6,675,299 B2 | 1/2004 | Porter et al. |
| 6,691,232 B1 | 2/2004 | Wood et al. |
| 6,721,767 B2 | 4/2004 | De Meno |
| 6,732,088 B1 | 5/2004 | Glance |
| 6,732,231 B1 | 5/2004 | Don |
| 6,732,244 B2 | 5/2004 | Ashton |
| 6,745,178 B1 | 6/2004 | Emens |
| 6,795,828 B2 | 9/2004 | Ricketts |
| 6,816,941 B1 | 11/2004 | Carlson |
| 6,820,070 B2 | 11/2004 | Goldman |
| 6,839,741 B1 | 1/2005 | Tsai |
| 6,839,803 B1 | 1/2005 | Loh |
| 6,850,994 B2 | 2/2005 | Gabryjelski |
| 6,860,422 B2 | 3/2005 | Hull et al. |
| 6,865,568 B2 | 3/2005 | Chau |
| 6,871,182 B1 | 3/2005 | Winnard |
| 6,892,221 B2 | 5/2005 | Ricart |
| 6,898,650 B1 | 5/2005 | Gao |
| 6,948,038 B2 | 9/2005 | Berkowitz |
| 6,948,039 B2 | 9/2005 | Biessener et al. |
| 6,957,186 B1 | 10/2005 | Guheen |
| 6,970,997 B2 | 11/2005 | Shibayama et al. |
| 6,976,039 B2 | 12/2005 | Chefalas |
| 6,995,675 B2 | 2/2006 | Curkendall |
| 6,996,616 B1 | 2/2006 | Leighton |
| 7,003,641 B2 | 2/2006 | Prahlad |
| 7,028,079 B2 | 4/2006 | Mastrianni |
| 7,035,880 B1 | 4/2006 | Crescenti |
| 7,039,860 B1 | 5/2006 | Gautestad |
| 7,054,960 B1 | 5/2006 | Bezbaruah |
| 7,058,661 B2 | 6/2006 | Ciaramitaro |
| 7,099,901 B2 | 8/2006 | Sutoh |
| 7,107,298 B2 | 9/2006 | Prahlad |
| 7,107,416 B2 | 9/2006 | Stuart et al. |
| 7,133,870 B1 | 11/2006 | Tripp et al. |
| 7,139,826 B2 | 11/2006 | Watanabe |
| 7,139,846 B1 | 11/2006 | Rossi |
| 7,146,387 B1 | 12/2006 | Russo |
| 7,155,421 B1 | 12/2006 | Haider |
| 7,155,481 B2 | 12/2006 | Prahlad |
| 1,717,158 A1 | 1/2007 | Yeung |
| 7,159,081 B2 | 1/2007 | Suzuki |
| 7,171,585 B2 | 1/2007 | Gail |
| 7,185,152 B2 | 2/2007 | Takahashi et al. |
| 7,188,141 B2 | 3/2007 | Novaes |
| 7,240,100 B1 | 7/2007 | Wein |
| 7,246,207 B2 | 7/2007 | Kottomtharayil et al. |
| 7,269,664 B2 | 9/2007 | Hutsch |
| 7,284,033 B2 | 10/2007 | Jhanji |
| 7,284,104 B1 | 10/2007 | Wu et al. |
| 7,287,047 B2 | 10/2007 | Kavuri |
| 7,290,017 B1 | 10/2007 | Wang |
| 7,313,659 B2 | 12/2007 | Suzuki |
| 7,315,923 B2 | 1/2008 | Retnamma |
| 7,328,325 B1 | 2/2008 | Solis et al. |
| 7,340,640 B1 | 3/2008 | Karr |
| 7,343,453 B2 | 3/2008 | Prahlad |
| 7,346,623 B2 | 3/2008 | Prahlad |
| 7,346,676 B1 | 3/2008 | Swildens et al. |
| 7,346,751 B2 | 3/2008 | Prahlad |
| 7,376,947 B2 | 5/2008 | Evers |
| 7,379,978 B2 | 5/2008 | Anderson |
| 7,383,379 B2 | 6/2008 | Patterson et al. |
| 7,386,535 B1 | 6/2008 | Kalucha |
| 7,395,282 B1 | 7/2008 | Crescenti |
| 7,421,460 B2 | 9/2008 | Chigusa et al. |
| 7,424,543 B2 | 9/2008 | Rice |
| 7,434,219 B2 | 10/2008 | DeMeno |
| 7,457,790 B2 | 11/2008 | Kochunni |
| 7,472,142 B2 | 12/2008 | Prahlad |
| 7,496,841 B2 | 2/2009 | Hadfield |
| 7,529,782 B2 | 5/2009 | Prahlad |
| 7,536,291 B1 | 5/2009 | Vijayan et al. |
| 7,543,125 B2 | 6/2009 | Gokhale |
| 7,565,484 B2 | 7/2009 | Ghosal |
| 7,577,689 B1 | 8/2009 | Masinter et al. |
| 7,577,694 B2 | 8/2009 | Nakano |
| 7,581,077 B2 | 8/2009 | Ignatius |
| 7,584,469 B2 | 9/2009 | Mitekura |
| 7,587,715 B1 | 9/2009 | Barrett |
| 7,593,935 B2 | 9/2009 | Sullivan |
| 7,596,713 B2 | 9/2009 | Mani-Meitav et al. |
| 7,603,626 B2 | 10/2009 | Williams |
| 7,606,844 B2 | 10/2009 | Kottorntharayil |
| 7,610,285 B1 | 10/2009 | Zoellner et al. |
| 7,617,262 B2 | 11/2009 | Prahlad |
| 7,656,849 B1 | 2/2010 | Evans |
| 7,668,884 B2 | 2/2010 | Prahlad |
| 7,673,175 B2 | 3/2010 | Mora et al. |
| 7,676,542 B2 | 3/2010 | Moser |
| 7,689,899 B2 | 3/2010 | Leymaster |
| 7,698,520 B2 | 4/2010 | Minami et al. |
| 7,730,031 B2 | 6/2010 | Forster |
| 7,734,593 B2 | 6/2010 | Prahlad |
| 7,734,669 B2 | 6/2010 | Kottomtharayil |
| 7,747,579 B2 | 6/2010 | Prahlad |
| 7,751,628 B1 | 7/2010 | Reisman |
| 7,761,409 B2 | 7/2010 | Stefik et al. |
| 7,792,789 B2 | 9/2010 | Prahlad |
| 7,801,871 B2 | 9/2010 | Gosnell |
| 7,814,118 B2 | 10/2010 | Kottomtharayil |
| 7,827,266 B2 | 11/2010 | Gupta |
| 7,831,793 B2 | 11/2010 | Chakravarty et al. |
| 7,840,537 B2 | 11/2010 | Gokhale |
| 7,844,676 B2 | 11/2010 | Prahlad |
| 7,865,517 B2 | 1/2011 | Prahlad |
| 7,865,938 B2 | 1/2011 | Shahbazi |
| 7,882,077 B2 | 2/2011 | Gokhale |
| 7,882,093 B2 | 2/2011 | Kotttorntharayll |
| 7,882,097 B1 | 2/2011 | Ogilvie |
| 7,937,393 B2 | 5/2011 | Prahlad |
| 7,937,420 B2 | 5/2011 | Tabellion |
| 7,937,702 B2 | 5/2011 | De Meno |
| 7,984,063 B2 | 7/2011 | Kottomtharayil |
| 7,984,435 B2 | 7/2011 | Kokkinen |
| 8,037,028 B2 | 10/2011 | Prahlad |
| 8,055,627 B2 | 11/2011 | Prahlad |
| 8,060,514 B2 | 11/2011 | Arrouye et al. |
| 8,069,218 B1 | 11/2011 | Tormasov |
| 8,078,607 B2 | 12/2011 | Oztekin et al. |
| 8,099,428 B2 | 1/2012 | Kottomtharayil |
| 8,108,427 B2 | 1/2012 | Prahlad |
| 8,117,173 B2 | 2/2012 | Gurevich |
| 8,126,854 B1 | 2/2012 | Sreedharan |
| 8,131,784 B1 | 3/2012 | Zhuge |
| 8,140,786 B2 | 3/2012 | Bunte |
| 8,145,742 B1 | 3/2012 | Parker |
| 8,156,086 B2 | 4/2012 | Lu |
| 8,161,003 B2 | 4/2012 | Kavuri |
| 8,170,995 B2 | 5/2012 | Prahlad |
| 8,200,637 B1 | 6/2012 | Stringham |
| 8,200,638 B1 | 6/2012 | Zheng |
| 8,219,524 B2 | 7/2012 | Gokhale |
| 8,229,954 B2 | 7/2012 | Prahlad |
| 8,230,054 B2 | 7/2012 | Mutnuru et al. |
| 8,230,195 B2 | 7/2012 | Amarendran |
| RE43,678 E | 9/2012 | Major et al. |
| 8,285,681 B2 | 10/2012 | Prahlad et al. |
| 8,307,177 B2 | 11/2012 | Prahlad |
| 8,347,088 B2 | 1/2013 | Moore et al. |
| 8,352,954 B2 | 1/2013 | Gokhale |
| 8,356,209 B2 | 1/2013 | Gunabalasubramaniam et al. |
| 8,364,652 B2 | 1/2013 | Vijayan |
| 8,370,166 B2 | 2/2013 | Ronnewinkel |
| 8,396,838 B2 | 3/2013 | Brockway et al. |
| 8,463,989 B2 | 6/2013 | Kumagai |
| 8,468,538 B2 | 6/2013 | Attarde et al. |
| 8,473,585 B1 | 6/2013 | Smith et al. |
| 8,477,618 B2 | 7/2013 | Martin |
| 8,495,331 B2 | 7/2013 | Matsumoto |

(56) References Cited

U.S. PATENT DOCUMENTS

| | | |
|---|---|---|
| 8,505,010 B2 | 8/2013 | De Meno |
| 8,510,573 B2 | 8/2013 | Muller |
| 8,578,120 B2 | 11/2013 | Attarde et al. |
| 8,612,394 B2 | 12/2013 | Prahlad |
| 8,655,850 B2 | 2/2014 | Ngo et al. |
| 8,706,867 B2 | 4/2014 | Vijayan |
| 8,707,070 B2 | 4/2014 | Muller |
| 8,719,809 B2 | 5/2014 | Gokhale |
| 8,725,688 B2 | 5/2014 | Lad |
| 8,769,048 B2 | 7/2014 | Kottomtharayil |
| 8,775,823 B2 | 7/2014 | Gokhale |
| 8,782,064 B2 | 7/2014 | Kottomtharayil |
| 8,826,284 B1 | 9/2014 | Fuller |
| 8,832,706 B2 | 9/2014 | Gokhale et al. |
| 8,849,762 B2 | 9/2014 | Kumarasamy |
| 8,959,299 B2 | 2/2015 | Ngo et al. |
| 8,966,288 B2 | 2/2015 | Ignatius |
| 9,092,378 B2 | 7/2015 | Kumarasamy |
| 9,122,692 B1 | 9/2015 | Dalal |
| 9,128,742 B1 | 9/2015 | Akolkar et al. |
| 9,128,883 B2 | 9/2015 | Gokhale |
| 9,262,226 B2 | 2/2016 | Gokhale et al. |
| 9,274,803 B2 | 3/2016 | De Meno et al. |
| 9,348,827 B1 | 5/2016 | Patwardhan |
| 9,411,821 B1 | 8/2016 | Patwardhan |
| 9,444,726 B2 | 9/2016 | Baldwin |
| 9,444,811 B2 | 9/2016 | Nara |
| 9,459,968 B2 | 10/2016 | Vijayan |
| 9,633,216 B2 | 4/2017 | Gokhale |
| 9,639,400 B2 | 5/2017 | Gokhale et al. |
| 9,645,762 B2 | 5/2017 | Nara |
| 9,648,100 B2 | 5/2017 | Klose et al. |
| 9,740,574 B2 | 8/2017 | Kochunni et al. |
| 9,766,825 B2 | 9/2017 | Bhagi |
| 10,157,184 B2 | 12/2018 | Yongtao et al. |
| 10,168,929 B2 | 1/2019 | Bhagi et al. |
| 10,310,950 B2 | 6/2019 | Kochunni et al. |
| 10,540,235 B2 | 1/2020 | Vijayan |
| 10,891,069 B2 | 1/2021 | Ashraft et al. |
| 2001/0012986 A1 | 8/2001 | Conan |
| 2001/0028363 A1 | 10/2001 | Nomoto |
| 2001/0052058 A1 | 12/2001 | Ohran |
| 2002/0032878 A1 | 3/2002 | Karpf |
| 2002/0049883 A1 | 4/2002 | Schneider |
| 2003/0028592 A1 | 2/2003 | Ooho |
| 2003/0046313 A1 | 3/2003 | Leung et al. |
| 2003/0046396 A1 | 3/2003 | Richter |
| 2003/0050979 A1 | 3/2003 | Takahashi |
| 2003/0065897 A1 | 4/2003 | Sadowsky |
| 2003/0095500 A1 | 5/2003 | Cao |
| 2003/0101086 A1 | 5/2003 | San Miguel |
| 2004/0039689 A1 | 2/2004 | Penney et al. |
| 2004/0068713 A1 | 4/2004 | Yannakoyorgos |
| 2004/0098383 A1 | 5/2004 | Tabellion |
| 2004/0098423 A1 | 5/2004 | Chigusa et al. |
| 2004/0220980 A1 | 11/2004 | Forster |
| 2004/0267815 A1 | 12/2004 | De Mes |
| 2005/0039069 A1 | 2/2005 | Prahlad |
| 2005/0071390 A1* | 3/2005 | Midgley ............. G06F 11/1464 |
| 2005/0076087 A1 | 4/2005 | Budd |
| 2005/0091346 A1 | 4/2005 | Krishnaswami et al. |
| 2005/0097070 A1 | 5/2005 | Enis |
| 2005/0114595 A1 | 5/2005 | Karr et al. |
| 2005/0149949 A1 | 7/2005 | Tipton et al. |
| 2005/0216788 A1 | 9/2005 | Mani-Meitav |
| 2005/0246510 A1 | 11/2005 | Retnamma |
| 2005/0251786 A1 | 11/2005 | Citron |
| 2006/0010286 A1 | 1/2006 | Topham et al. |
| 2006/0036619 A1 | 2/2006 | Fuerst |
| 2006/0070061 A1 | 3/2006 | Cox |
| 2006/0080370 A1 | 4/2006 | Torii |
| 2006/0110286 A1 | 5/2006 | Boukas |
| 2006/0115802 A1 | 6/2006 | Reynolds |
| 2006/0116999 A1 | 6/2006 | Dettinger |
| 2006/0149604 A1 | 7/2006 | Miller |
| 2006/0149724 A1 | 7/2006 | Ritter |
| 2006/0177114 A1 | 8/2006 | Tongdee et al. |
| 2006/0195678 A1 | 8/2006 | Jalobeanu |
| 2006/0195838 A1 | 8/2006 | Epstein |
| 2006/0224846 A1 | 10/2006 | Amarendran |
| 2006/0224852 A1 | 10/2006 | Kottomtharayil |
| 2006/0265396 A1 | 11/2006 | Raman et al. |
| 2006/0271935 A1 | 11/2006 | Cox |
| 2006/0282900 A1 | 12/2006 | Johnson et al. |
| 2007/0014347 A1 | 1/2007 | Prechtl |
| 2007/0016750 A1 | 1/2007 | Suzuki |
| 2007/0022122 A1 | 1/2007 | Bahar |
| 2007/0022145 A1 | 1/2007 | Kavuri |
| 2007/0028229 A1 | 2/2007 | Knatcher |
| 2007/0043715 A1 | 2/2007 | Kaushik |
| 2007/0061298 A1 | 3/2007 | Wilson et al. |
| 2007/0067595 A1 | 3/2007 | Ghose |
| 2007/0128899 A1 | 6/2007 | Mayer |
| 2007/0136541 A1 | 6/2007 | Herz et al. |
| 2007/0143497 A1 | 6/2007 | Kottomtharayil |
| 2007/0156783 A1 | 7/2007 | Zbogar-Smith et al. |
| 2007/0166674 A1 | 7/2007 | Kochunni |
| 2007/0174246 A1 | 7/2007 | Sigurdsson |
| 2007/0183493 A1 | 8/2007 | Kimpe |
| 2007/0185915 A1 | 8/2007 | Prahlad et al. |
| 2007/0208788 A1 | 9/2007 | Chakravarty et al. |
| 2007/0220308 A1 | 9/2007 | Yeung et al. |
| 2007/0226320 A1 | 9/2007 | Hager et al. |
| 2007/0226535 A1 | 9/2007 | Gokhale |
| 2007/0250810 A1 | 10/2007 | Tittizer |
| 2007/0271308 A1 | 11/2007 | Bentley et al. |
| 2007/0288861 A1 | 12/2007 | Tabellion et al. |
| 2007/0294321 A1* | 12/2007 | Midgley ............. G06F 11/1464 |
| 2007/0296258 A1 | 12/2007 | Calvert et al. |
| 2008/0016310 A1 | 1/2008 | Ghosal et al. |
| 2008/0022003 A1 | 1/2008 | Alve |
| 2008/0033903 A1 | 2/2008 | Carol et al. |
| 2008/0126302 A1 | 5/2008 | Mora et al. |
| 2008/0155205 A1 | 6/2008 | Gokhale |
| 2008/0177994 A1 | 7/2008 | Mayer |
| 2008/0263297 A1 | 10/2008 | Herbst et al. |
| 2008/0263565 A1 | 10/2008 | Luther |
| 2008/0282048 A1 | 11/2008 | Miura |
| 2008/0288948 A1 | 11/2008 | Attarde et al. |
| 2009/0119322 A1 | 5/2009 | Mills |
| 2009/0150168 A1 | 6/2009 | Schmit |
| 2009/0171883 A1 | 7/2009 | Kochunni |
| 2009/0187908 A1 | 7/2009 | He |
| 2009/0228531 A1 | 9/2009 | Baumann |
| 2009/0307448 A1 | 12/2009 | Gokhale |
| 2009/0319534 A1 | 12/2009 | Gokhale |
| 2010/0005259 A1 | 1/2010 | Prahlad |
| 2010/0036772 A1 | 2/2010 | Arceneaux |
| 2010/0070466 A1 | 3/2010 | Prahlad |
| 2010/0070474 A1 | 3/2010 | Kamleshkumar |
| 2010/0114837 A1 | 5/2010 | Prahlad |
| 2010/0125477 A1 | 5/2010 | Mousseau |
| 2010/0161773 A1 | 6/2010 | Prahlad |
| 2010/0172301 A1 | 7/2010 | Watfa |
| 2010/0180332 A1 | 7/2010 | Ben-Yochanan |
| 2010/0205582 A1 | 8/2010 | Liu |
| 2010/0250549 A1 | 9/2010 | Muller |
| 2010/0262911 A1 | 10/2010 | Kaplan et al. |
| 2010/0299490 A1 | 11/2010 | Attarde et al. |
| 2010/0306283 A1 | 12/2010 | Johnson et al. |
| 2010/0306643 A1 | 12/2010 | Chabot et al. |
| 2010/0332401 A1 | 12/2010 | Prahlad |
| 2010/0332454 A1 | 12/2010 | Prahlad |
| 2010/0332456 A1 | 12/2010 | Prahlad et al. |
| 2010/0332479 A1 | 12/2010 | Prahlad |
| 2011/0016091 A1 | 1/2011 | Prahlad |
| 2011/0069179 A1 | 3/2011 | Bathiche et al. |
| 2011/0093471 A1 | 4/2011 | Brockway et al. |
| 2011/0161299 A1 | 6/2011 | Prahlad et al. |
| 2011/0173202 A1 | 7/2011 | Paknad et al. |
| 2011/0231362 A1 | 9/2011 | Attarde et al. |
| 2011/0302141 A1 | 12/2011 | Nadathur |
| 2012/0011515 A1 | 1/2012 | Jolfaei |
| 2012/0066633 A1 | 3/2012 | Saito |

(56) References Cited

U.S. PATENT DOCUMENTS

| | | |
|---|---|---|
| 2012/0084524 A1 | 4/2012 | Gokhale |
| 2012/0084782 A1 | 4/2012 | Chou |
| 2012/0094674 A1 | 4/2012 | Wu |
| 2012/0150818 A1 | 6/2012 | Retnamma |
| 2012/0150826 A1 | 6/2012 | Retnamma |
| 2012/0203742 A1 | 8/2012 | Goodman et al. |
| 2012/0254116 A1 | 10/2012 | Thereka et al. |
| 2012/0254824 A1 | 10/2012 | Bansod |
| 2012/0263191 A1 | 10/2012 | Baron |
| 2012/0272205 A1 | 10/2012 | Fox |
| 2012/0275598 A1 | 11/2012 | Vimpari et al. |
| 2012/0317085 A1 | 12/2012 | Green et al. |
| 2013/0006625 A1 | 1/2013 | Gunatilake et al. |
| 2013/0007710 A1 | 1/2013 | Vedula |
| 2013/0013883 A1 | 1/2013 | Kottomtharayil |
| 2013/0024429 A1 | 1/2013 | Raas |
| 2013/0024568 A1 | 1/2013 | Popczynski |
| 2013/0046817 A1 | 2/2013 | Isbister |
| 2013/0104027 A1 | 4/2013 | Bennett et al. |
| 2013/0110854 A1 | 5/2013 | Kimber et al. |
| 2013/0111326 A1 | 5/2013 | Lockhart |
| 2013/0136253 A1 | 5/2013 | Liberman Ben-Ami et al. |
| 2013/0179405 A1 | 7/2013 | Bunte |
| 2013/0219458 A1 | 8/2013 | Ramanathan et al. |
| 2013/0232184 A1 | 9/2013 | Grube |
| 2013/0238562 A1 | 9/2013 | Kumarasamy |
| 2013/0238969 A1 | 9/2013 | Smith et al. |
| 2013/0262387 A1 | 10/2013 | Varadharajan |
| 2013/0262396 A1 | 10/2013 | Kripalani |
| 2013/0262410 A1 | 10/2013 | Liu et al. |
| 2013/0262615 A1 | 10/2013 | Ankireddypalle |
| 2013/0262706 A1 | 10/2013 | Stahlberg |
| 2013/0326159 A1 | 12/2013 | Vijayan |
| 2013/0332412 A1 | 12/2013 | Amarendran |
| 2014/0025641 A1 | 1/2014 | Kumarasamy |
| 2014/0026000 A1 | 1/2014 | Ma |
| 2014/0040210 A1 | 2/2014 | Avery |
| 2014/0040580 A1 | 2/2014 | Kripalani |
| 2014/0046900 A1 | 2/2014 | Kumarasamy |
| 2014/0046904 A1 | 2/2014 | Kumarasamy |
| 2014/0086127 A1 | 3/2014 | Kim |
| 2014/0108351 A1 | 4/2014 | Nallathambi |
| 2014/0108355 A1 | 4/2014 | Prahlad |
| 2014/0108470 A1 | 4/2014 | Lad |
| 2014/0150023 A1 | 5/2014 | Gudorf |
| 2014/0172793 A1 | 6/2014 | Stritzel |
| 2014/0180664 A1 | 6/2014 | Kochunni |
| 2014/0181032 A1 | 6/2014 | Kumarasamy |
| 2014/0181037 A1 | 6/2014 | Pawar |
| 2014/0181045 A1 | 6/2014 | Pawar |
| 2014/0181085 A1 | 6/2014 | Gokhale |
| 2014/0181443 A1 | 6/2014 | Kottomtharayll |
| 2014/0188804 A1 | 7/2014 | Gokhale et al. |
| 2014/0188805 A1 | 7/2014 | Vijayan |
| 2014/0188812 A1 | 7/2014 | Vijayan |
| 2014/0189432 A1 | 7/2014 | Gokhale |
| 2014/0201140 A1 | 7/2014 | Vibhor |
| 2014/0201142 A1 | 7/2014 | Varadharajan |
| 2014/0201150 A1 | 7/2014 | Kumarasamy |
| 2014/0201154 A1 | 7/2014 | Varadharajan |
| 2014/0201155 A1 | 7/2014 | Vijayan |
| 2014/0201161 A1 | 7/2014 | Kumarasamy |
| 2014/0201162 A1 | 7/2014 | Kumarasamy |
| 2014/0201171 A1 | 7/2014 | Vijayan |
| 2014/0250076 A1 | 9/2014 | Lad |
| 2014/0279922 A1 | 9/2014 | Kottomtharayil et al. |
| 2014/0281214 A1 | 9/2014 | Rehm |
| 2014/0289189 A1 | 9/2014 | Chan |
| 2014/0289196 A1 | 9/2014 | Chan |
| 2014/0365443 A1 | 12/2014 | Goel |
| 2015/0081948 A1 | 3/2015 | Thereska |
| 2015/0193229 A1 | 7/2015 | Bansod et al. |
| 2015/0227355 A1 | 8/2015 | Tripoli |
| 2015/0234879 A1 | 8/2015 | Baldwin |
| 2015/0244775 A1 | 8/2015 | Vibhor |
| 2015/0256617 A1 | 9/2015 | Klose et al. |
| 2015/0278024 A1 | 10/2015 | Barman et al. |
| 2015/0301903 A1 | 10/2015 | Mutha et al. |
| 2015/0324226 A1 | 11/2015 | Gokhale et al. |
| 2015/0324233 A1 | 11/2015 | Gokhale |
| 2015/0324255 A1 | 11/2015 | Kochunni et al. |
| 2015/0331899 A1 | 11/2015 | Gokhale et al. |
| 2015/0347238 A1 | 12/2015 | Kumarasamy et al. |
| 2016/0110266 A1 | 4/2016 | Nara |
| 2016/0224384 A1 | 8/2016 | Gokhale et al. |
| 2016/0350029 A1 | 12/2016 | Nara et al. |
| 2017/0024286 A1 | 1/2017 | Vijayan |
| 2017/0134492 A1 | 5/2017 | Klose et al. |
| 2017/0160970 A1 | 6/2017 | Gokhale |
| 2017/0160971 A1 | 6/2017 | Gokhale |
| 2017/0199924 A1 | 7/2017 | Gokhale |
| 2017/0206018 A1 | 7/2017 | Nara et al. |
| 2017/0206112 A1 | 7/2017 | Gokhale |
| 2018/0011767 A1 | 1/2018 | Kochunni et al. |
| 2018/0013825 A1 | 1/2018 | Klose et al. |
| 2018/0129435 A1 | 5/2018 | Bhagi et al. |
| 2018/0225177 A1 | 8/2018 | Bhagi et al. |
| 2018/0275881 A1 | 9/2018 | Ashraf |
| 2018/0285201 A1 | 10/2018 | Bangalore |
| 2018/0285209 A1 | 10/2018 | Liu |
| 2018/0285353 A1 | 10/2018 | Rao |
| 2019/0065509 A1 | 2/2019 | Liu et al. |
| 2019/0073254 A1 | 3/2019 | Vibhor et al. |
| 2019/0087108 A1 | 3/2019 | Bhagi et al. |
| 2019/0138397 A1 | 5/2019 | Kottomtharayil |
| 2019/0243911 A1 | 8/2019 | Kobozev et al. |
| 2019/0278668 A1 | 9/2019 | Kochunni et al. |
| 2019/0286839 A1 | 9/2019 | Mutha et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0910019 | 4/1999 |
| EP | 0981090 | 2/2000 |
| EP | 0986011 | 3/2000 |
| EP | 1035690 | 9/2000 |
| GB | 2216368 | 10/1989 |
| JP | 07-046271 | 2/1995 |
| JP | 7073080 | 3/1995 |
| JP | 8044598 | 2/1996 |
| JP | 2000035969 | 2/2000 |
| JP | 2003531435 | 10/2003 |
| WO | 199513580 | 5/1995 |
| WO | 199912098 | 3/1999 |
| WO | 200058865 | 10/2000 |
| WO | 200106368 | 1/2001 |
| WO | 200116693 | 3/2001 |
| WO | 200180005 | 10/2001 |
| WO | 2010057199 | 5/2010 |

OTHER PUBLICATIONS

"Multi Instancing," retrieved from http://documentation.commvault.com/hds/release_8_0_0/books_online_1/english_us/deployment/install/misc/rnulti_instancing.htm[Feb. 18, 2014 11:57:19 AM] on Feb. 18, 2014, 3 pages.

U.S. Appl. No. 15/680,031 of Klose et al., filed Aug. 17, 2017.

Abbot, K., et al., "Administration and Autonomy in a Republican-Transparent Distributed DBMS." VLDB. 1988.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International

(56) References Cited

OTHER PUBLICATIONS

Conference, Mar. 5, 1995-Mar. 9, 1995, pp. 420-427, San Francisco, CA.
Eitel, "Backup and Storage Management in Distributed Heterogeneous Environments," IEEE, Jun. 12-16, 1994, pp. 124-126.
Extended European Search Report for Application No. EP 09767119, dated Feb. 11, 2013, 12 pages.
Gait, J., "The Optical File Cabinet: A Random-Access File System for Write-Once Optical Disks," IEEE Computer, vol. 21, No. 6, pp. 11-22 (Jun. 1988).
Hennessy et al., "Computer Architecture—A Quantitative Approach", 2nd Edition, 1996, pp. 246-250.
Hutchinson, Norman C., et al. "Logical vs. physical file system backup." OSDI. vol. 99. 1999, 12 pages.
International Search Report and Written Opinion for International Application No. PCT/US09/32325, dated Mar. 17, 2009, 11 pages.
Jander, M., "Launching Storage-Area Net," Data Communications, US, McGraw Hill, NY, vol. 27, No. 4 (Mar. 21, 1998), pp. 64-72.
Matthews, Jeanna, et al. "Data protection and rapid recovery from attack with a virtual private file server and virtual machine appliances." Proceedings of the IASTED International Conference on Communication, Network and Information Security (CNIS 2005). 2005, 14 pages.
Microsoft Press Computer Dictionary Third Edition, "Data Compression," Microsoft Press, 1997, p. 130.
Pitoura et al., "Locating Objects in Mobile Computing", IEEE Transactions on Knowledge and Data Engineering, vol. 13, No. 4, Jul./Aug. 2001, pp. 571-592.
Quinlan, Sean. "A cached worm file system." Software: Practice and Experience 21.12 (1991 ): 1289-1299.
Rosenblum et al., "The Design and Implementation of a Log-Structured File System," Operating Systems Review SIGOPS, vol. 25, No. 5, New York, US, pp. 1-15 (May 1991).
Rowe et al., "Indexes for User Access to Large Video Databases", Storage and Retrieval for Image and Video Databases II, IS,& T/SPIE Symp. on Elec. Imaging Sci. & Tech., Feb. 1994, pp. 1-12.
Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.
Wu, Chin-Hsien, Tei-Wei Kuo, and Li-Pin Chang. "Efficient initialization and crash recovery for log-based file systems over flash memory." Proceedings of the 2006 ACM symposium on Applied computing. ACM, 2006, 5 pages.
Stender, Jan. "Snapshots in large-scale distributed file systems." (2013).
Motamari, Pushparaj. "Snapshotting in Hadoop Distributed File System for Hadoop Open Platform as Service." KTH Master Thesis (2014).
Hsiao, David K., "Federated databases and systems: part i-a tutorial on tehri data sharing." The VLDB Journal 1.1 (1992): 127-179.
Pollack, et al., "Quota enforcement for high-performance distributed storage systems," 24th IEEE Conference on Mass Storage Systems and Technologies (MSST 2007), Sep. 24-27, 2007, pp. 72-86.
Prigge, "Review: ExaGrid aces disk-to-disk backup," Jan. 3, 2013, InfoWorld, 12 pages.

\* cited by examiner

BROWSING DATA STORED IN A BACKUP FORMAT

CROSS-REFERENCE TO RELATED APPLICATION(S)

The present application is a Continuation of U.S. pat. app. Ser. No. 15/282,526 filed Sep. 30, 2016, which is a divisional of U.S. patent application Ser. No. 13/793,210 filed Mar. 11, 2013, now U.S. Pat. No. 9,459,968, which is hereby incorporated herein by reference in its entirety.

BACKGROUND

Computer systems contain large amounts of information. This information includes personal information, such as financial information, customer/client/patient contact information, business information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, and then create one or more secondary copies, such as backup files, containing the contents of the file. These secondary copies can then later be used to restore the original data should anything happen to the original data.

Traditional storage systems often use multiple backup formats to store backed up copies of files.

DETAILED DESCRIPTION

Figure 1:
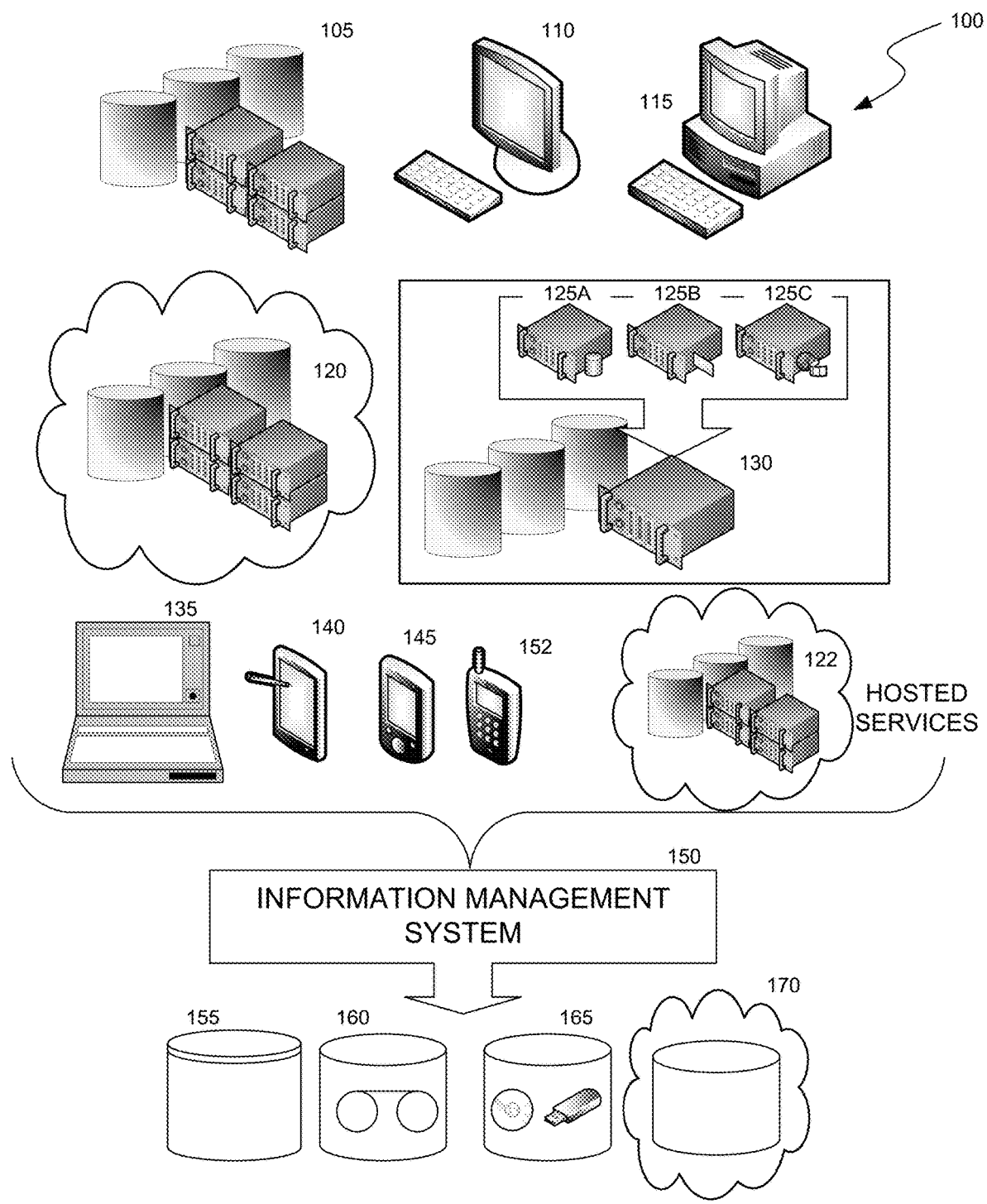
FIG. 1 is a block diagram illustrating an example of a suitable information management environment in which aspects of the inventive systems and methods may operate.

The system described herein provides techniques that can simplify data backup and recovery operations for data stored in multiple backup formats. Data storage in multiple backup formats may occur due to a backup operation being performed on one type of backup data (e.g., a zip file or a snapshot) into another type of backup format (e.g., a tape archive or a cloud based backup or a disk array backup).

As further described in greater detail below, a computer backup operation may not only back up typical user files such as documents, emails, pictures, audio files, video files, etc., but also files that themselves are backup files or compressed zip files. For example, a zip file on a user's hard drive may itself include multiple files compressed within the zip folder. When the zip file is backed up to, e.g., a tape drive, the restoration of the files included in the zip folder may be performed using a two-step process—first restore the zip file from the backup storage and then run an unzip application to find out a list of files contained within the zip file.

As another example, snapshots, which are quick captures of the state of a file system, may be stored on a local drive and may get copied to a backup drive such as a tape drive. When a user wants to restore files contained within the snapshot, the user may first have to restore the snapshot using a first GUI and then use a snapshot browsing GUI to locate a desired file within the snapshot.

The task of locating a user file in data stored in multiple backup formats that may be nested within each other (e.g., a tape backup that contains a snapshot that contains a zip file), becomes cumbersome for a system administrator because, to locate a file that a user is interested in restoring, the system administrator may need to open multiple windows for multiple applications programs, each window allowing the administrator to browse files in one particular backup format.

Technologies described herein, in some implementations, simplify the backup/restoration process. In some implementations, during data backup, a single index table, called a master index table, is generated for all files being backed up. In some implementations, information is stored in the master index table so that, in response to a search query, looking up only the master index table is sufficient, regardless of the backup format of the queried file, to obtain information about how to locate the queries file. In some implementations, during restoration, a user may be able to navigate through backed up files of multiple backup formats, by simply interactive with a single GUI window. These features, and other techniques, are further discussed below.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010-0332456, which is hereby incorporated by reference herein in its entirety.

Figure 2:
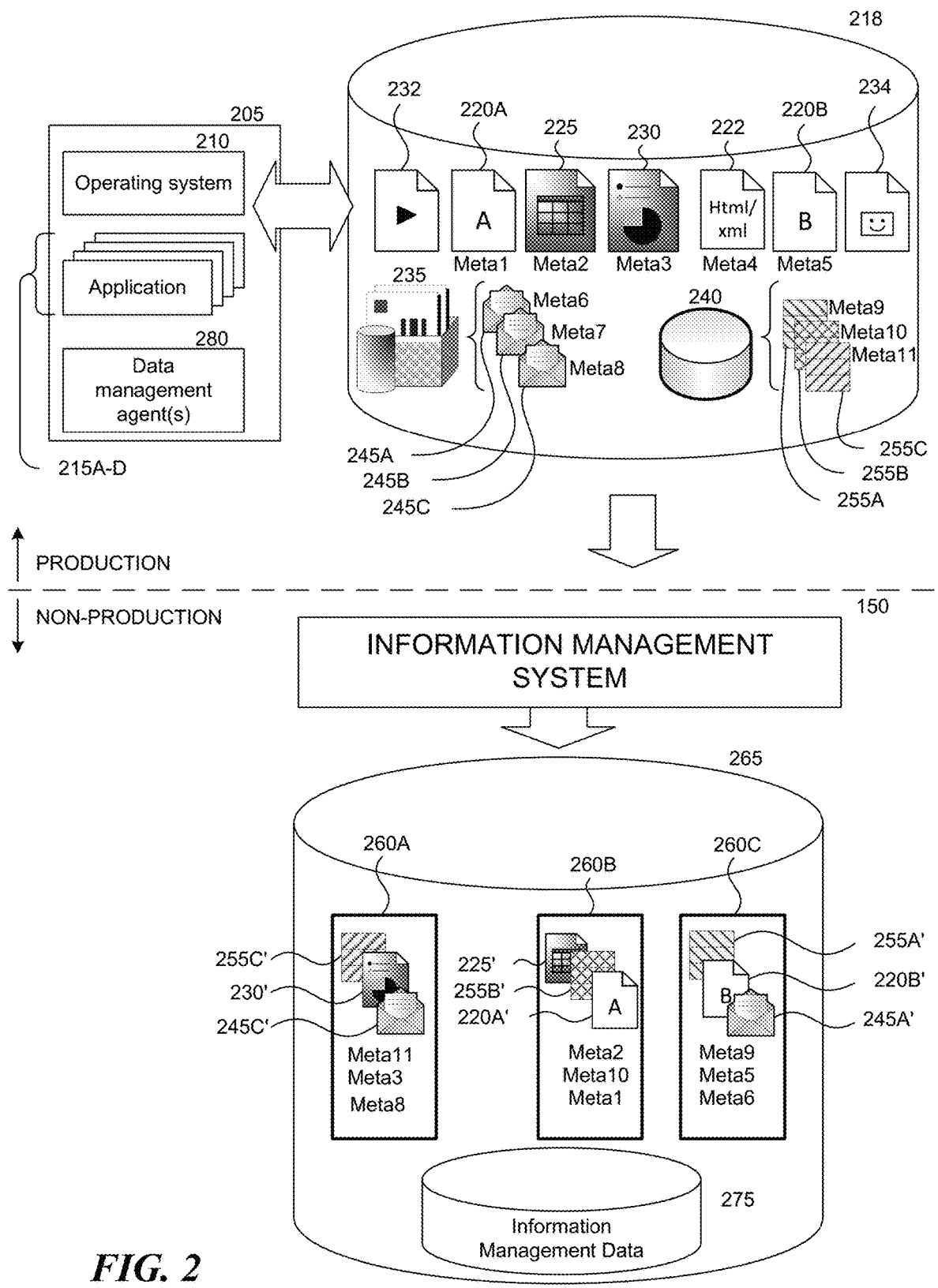
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, which permit the information management system to perform its various information management tasks. As shown in FIG. 2, a computing device 205 may include one or more data management agents 280 that provide client-side functions for the information management system.

Information Management System

Figure 3:
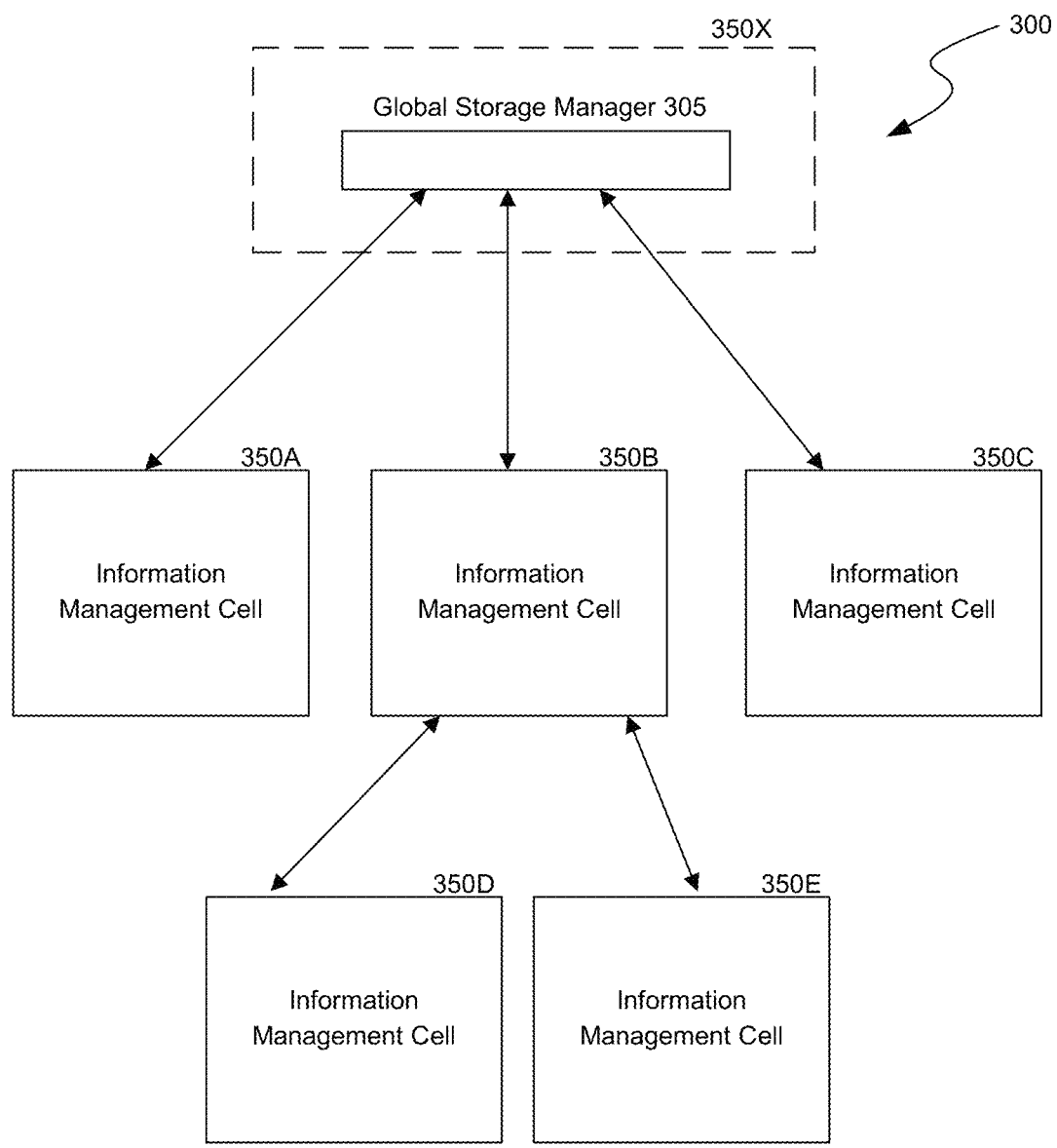
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
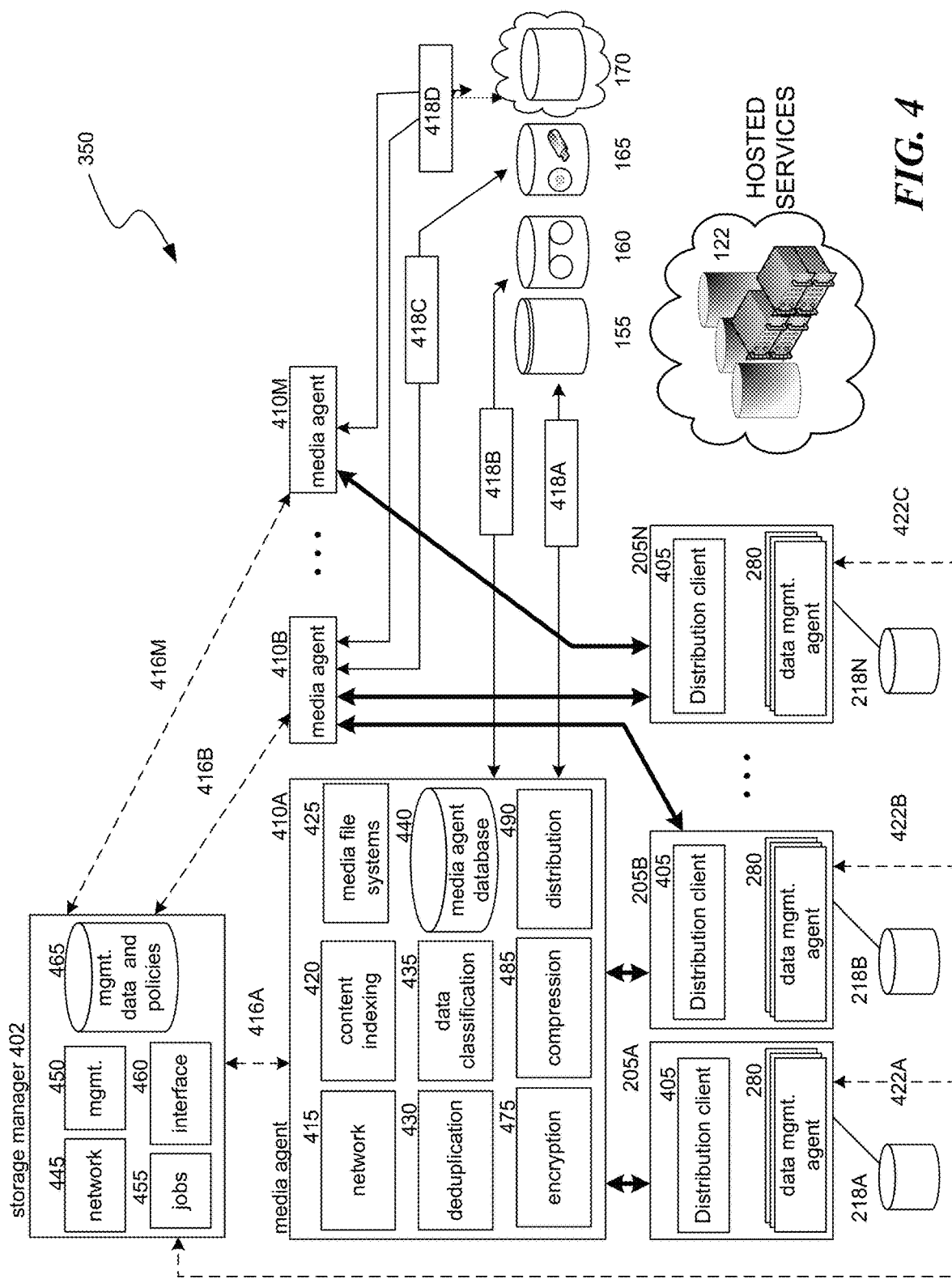
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-70, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced more fully and incorporated by reference above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each includes a set of criteria and rules associated with performing an information management operation. The criteria may be used to determine which rules apply to a particular data object, system component, or information management operation, an may include:
- frequency with which a production or non-production copy of a data object or metadata has been or is predicted to be used, accessed, or modified;
- access control lists or other security information;
- the sensitivity (e.g., confidentiality) of a data object as determined by its content and/or metadata;
- time-related factors;
- deduplication information;
- the computing device, hosted service, computing process, or user that created, modified, or accessed a production copy of a data object; and
- an estimated or historic usage or cost associated with different components.

The rules may specify, among other things:
- a schedule for performing information management operations,
- a location (or a class or quality of storage media) for storing a non-production copy,
- preferences regarding the encryption, compression, or deduplication of a non-production copy,
- resource allocation between different computing devices or other system components (e.g., bandwidth, storage capacity),
- whether and how to synchronize or otherwise distribute files or other data objects across multiple computing devices or hosted services,
- network pathways and components to utilize (e.g., to transfer data) during an information management operation, and
- retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-70. Each media agent 410 may control one or more intermediary storage devices 418, such as a cloud server or a tape or magnetic disk library management system, to read, write, or otherwise manipulate data stored in a non-production storage medium 155-70. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other.

Examples of Multiple Copy Formats

Computer users often back up or copy files from their computers and store the backed up or copied files as archives. In a managed network, e.g., a corporate or a small business network, data backup/copy operations are typically controlled by system administrators. Using tools such as software modules and dedicated backup storage servers, system administrators typically perform backups of user computers on a periodic basis (e.g., every day, every week, etc.). (While the following description uses "backup" or like terms as a shorthand, all manner of secondary copies are contemplated and encompassed by the present document.)

The periodic backups using dedicated backup storage servers often take up valuable computational and bandwidth resources in a local area network. One solution to alleviate the network bandwidth utilization is to perform periodic backup of computer files locally at each user's computer. Such backups, which may use snapshots of the file system, may be performed in a short time (e.g., few seconds) and store information about user and system directories and files on the user's computer at the time the snapshot is taken, or depending on the type of snapshot, store information regarding blocks of data that may have changed. Snapshots may be abbreviated listing of files and directories present on the local computer at the time the snapshot is taken. Further details on snapshots may be found in the assignee's U.S. application Ser. No. 12/979,101, filed Dec. 27, 2011, entitled SYSTEMS AND METHODS FOR PERFORMING DATA MANAGEMENT OPERATIONS USING SNAPSHOTS, incorporated by reference in its entirety herein.

Many vendors offer products for the above-described snapshot operation or some variations thereof. Some examples include QSnap by CommVault, volume shadow copying services offered with Microsoft Windows XP, Vista and 2003 operating systems, NetWare software by Novell, products from EMC corporation, NetApp Snapshot technology, Hitachi ShadowImage, and so on. Some hard drive manufacturers also offer a way for taking hardware based snapshot of the data stored on a hard drive.

While these snapshot technology solutions offers the benefit of making quick, and frequent, backups of local data at a computer, these solutions create operational problems and inefficiencies that remain unaddressed by the present day solutions. For example, if multiple snapshot technologies are used on different client computers in a network, an additional overhead of deploying multiple snapshot browsing applications and training information technology (IT) personnel to be able to use these multiple different applications, each possibly using its own proprietary snapshot storage and index format, is incurred by an organization. Second, the snapshot, and the corresponding index table that allows a user to browse through a snapshot to see names of the directories and files included in the snapshot, are both typically stored on the client computer. Therefore, when a computer goes down, the snapshot data becomes unrecoverable and unbrowsable. Even when local snapshots from client computers are backed up to an external storage system, data browsing and recovery may be difficult because snapshots often use pointers and "diff" data and it may not be possible to restore complete data files without recovering multiple snapshots one at a time and browsing individually through the multiple snapshots to locate the base file and all diff snapshots.

The use of a single index to query multiple backup formats overcomes the above discussed problems, and others. The disclosed techniques streamline the operations of data backups and browsing and restoring backed up data. For example, when a user or a system administrator is looking for a particular file from a client computer by browsing backups, the user may only have to look up a single index that holds information about where the file can be found on the backup system—either in its primary backup format, or in its snapshot backup format, or both.

The multiple backup formats may be backup device-specific or may be due to different backing up techniques. In some implementations, a single index table can be created so that the backed up data, irrespective of the backup format, can be stored or accessed using the single access table. The disclosed techniques offer several advantages over current practices. For example, data can be restored by looking up a single index, thereby reducing the amount of menus that an operator has to navigate through, to browse through backup data and restore data files. In another advantageous aspect, the use of a single index eliminates an intermediate step during a backup or restoration stage of having to stage data in an intermediate formats, thereby reducing the amount of memory and processor power used during the backup or restoration operation. These, and other, advantages are further disclosed below.

Examples of Snapshot Technologies

Snapshot technology is briefly discussed in this patent document for improving a reader's understanding of the claimed subject matter but the discussion does not in any way limit the scope of the claimed technology. As previously described, a snapshot can include a picture of data storage at a given point in time. For example, some snapshots only reflect changed blocks in a data storage device (e.g. on a disk). Alternatively, a snapshot can include a listing of the directory/file structure on a storage device at a given point in time, and it is this type of snapshot that is generally described below, though all types of snapshots may be used.

A snapshot may include only file names and directory names or may include partial data for some of the files (e.g., modifications since the last snapshot) or may include data underlying some or all files in the snapshot. In other words, some snapshots are browsable only to see which files and directories were present on the hard drive at a given time, while other snapshots may be browsable to not only see the folders, but also access contents of the files. In some cases, when file content is only incrementally available as changes from previous stored versions, multiple snapshots may have to be browsed for locating or creating a complete version of a file. Further details may be found in the assignee's U.S. application Ser. No. 12/979,101, filed Dec. 27, 2011, entitled SYSTEMS AND METHODS FOR PERFORMING DATA MANAGEMENT OPERATIONS USING SNAPSHOTS.

As previously described, various vendors offer software only, hardware only, or combined hardware-software solutions for taking snapshots of the above-described production data. Each vendor typically stores the snapshots, and the associated indexing information, in a unique, vendor-proprietary format. Furthermore, all the snapshot and indexing formats are different from storage and indexing formats for other storage media such as tape drives, optical disks and so on.

Data Backup Using Snapshots

Figure 5:
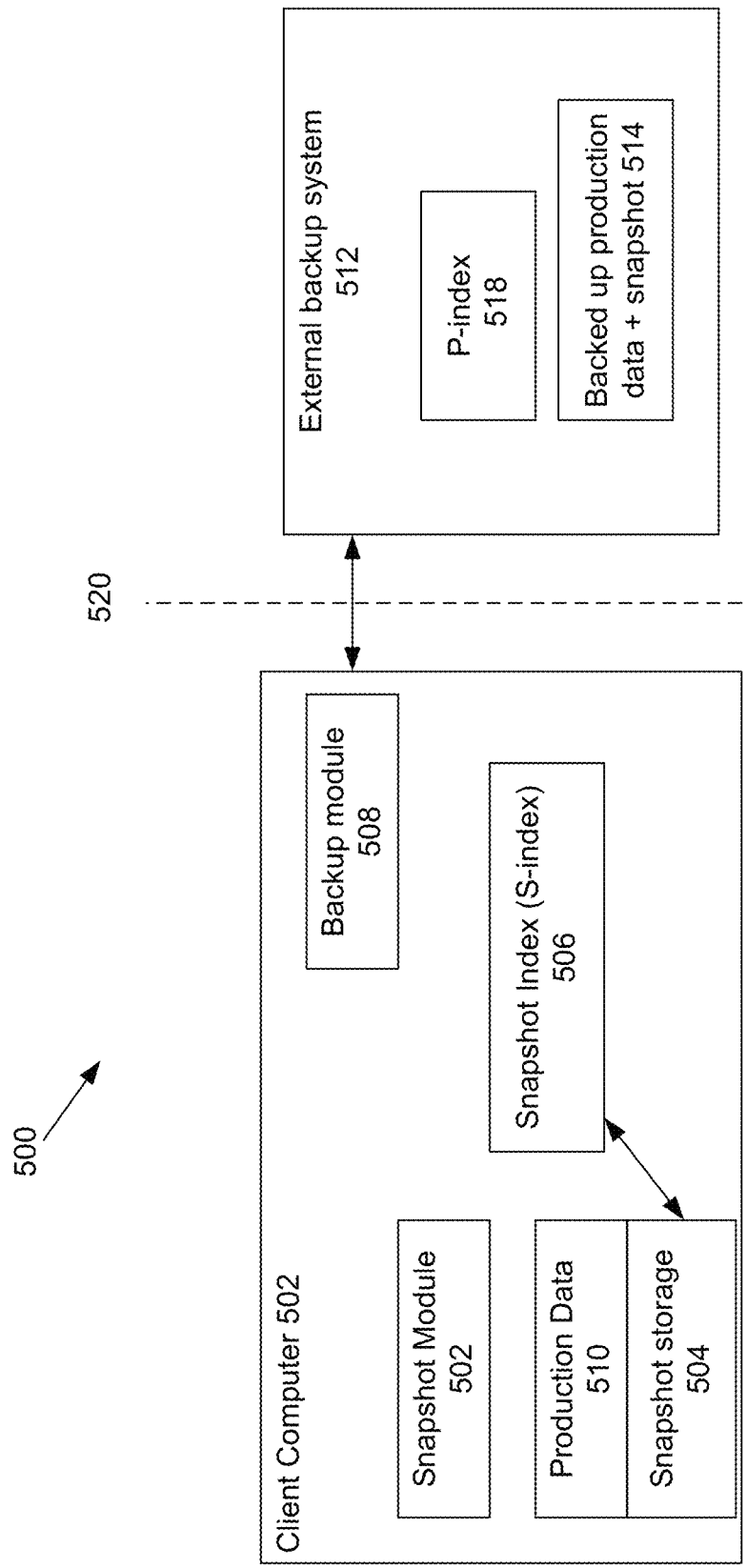
FIG. 5 is a block diagram representation of a backup system that uses a snapshot index table (S-index) and a production data index table (P-index) for data backup/restoration.

FIG. 5 is a block diagram illustrating a system 500 in which a client computer 502 is communicatively coupled with an external backup system 512 over a suitable network 520. The client computer 502 includes a snapshot module 502, a snapshot storage module 504, a snapshot index (S-index) 506, a backup module 508 and a module that stores production data 510.

The snapshot module 502 may be programmed or controlled by a system administrator to take snapshots of the production data 510 from time to time (e.g. once every hour). The production data may include snapshot storage 504 in which one or more previously captured snapshots are stored. At the time of taking the snapshot, a snapshot index (S-index) 506 may also be generated and stored with the snapshot in the snapshot storage 504 or elsewhere in the system. The S-index 506 may store multiple snapshot index tables, each corresponding to a previously captured snapshot. For example, in some implementations, the S-index may be stored via a media agent. In some implementations, the S-index may include a catalog of all items (files, folders etc.) corresponding to the snapshot. The S-index may enable keeping track of file names, file size, last modified, access authorization, etc. for the files included in the snapshot.

The backup module 508 may, from time to time, perform backup operation on the data stored on the client computer 502, including production data 510 and snapshot data (504, 506). In some implementations, the production data 510 may be indistinguishable from the snapshot data to the backup module 508. In other words, in some implementations, the snapshot data and the corresponding S-index may look like just another file in the production data 510. The backup module may transfer the data from the client computer over the network 520 to the external backup system 512. During the backup operation, the backup system 512 may create backed up production data 514 and backed up snapshot data 516, with the snapshot data 516 appearing to be a file in the production data. The backup system 512 may also produce an index file cataloging the files stored on production and snapshot data 514.

A P-index file resides on or is controlled by a media agent (i.e., the media agent that performed the corresponding backup operation). The snapshot and backup operations may be centrally controlled by a computer that itself may not store actual indexes from all client computers. A central database may not have sufficient resources to store indexing information for thousands of clients and millions of files on the client computers. A given media agent may include index information for multiple clients, similarly a given client's index information may be available on multiple different media agents, as defined by storage policy. Some implementations may share indexes among different media agents because they use the same format of indexing (e.g., index cache server). The various client indexes may each store data on all files stored on or managed by the client.

Some present day systems have different index tables for different media—e.g., one format for tape, another format for hard drive, and so on. However, the above described P-index may be stored in a backup media agnostic format. For example, copies of backup (e.g., a copy from a tape drive to a disk) thus may have the same index. Maintaining media agnostic indexes avoids regeneration of index data during the copying operation.

As previously described, snapshots may be created in a variety of formats that are vendor-dependent. Typically, each vendor may also provide a software application or a snap-format specific GUI that can be used to display files stored in a snapshot back to a user. These typical S-index formats are different from the format of the P-index generated using data backup to the external backup system.

Figure 6:
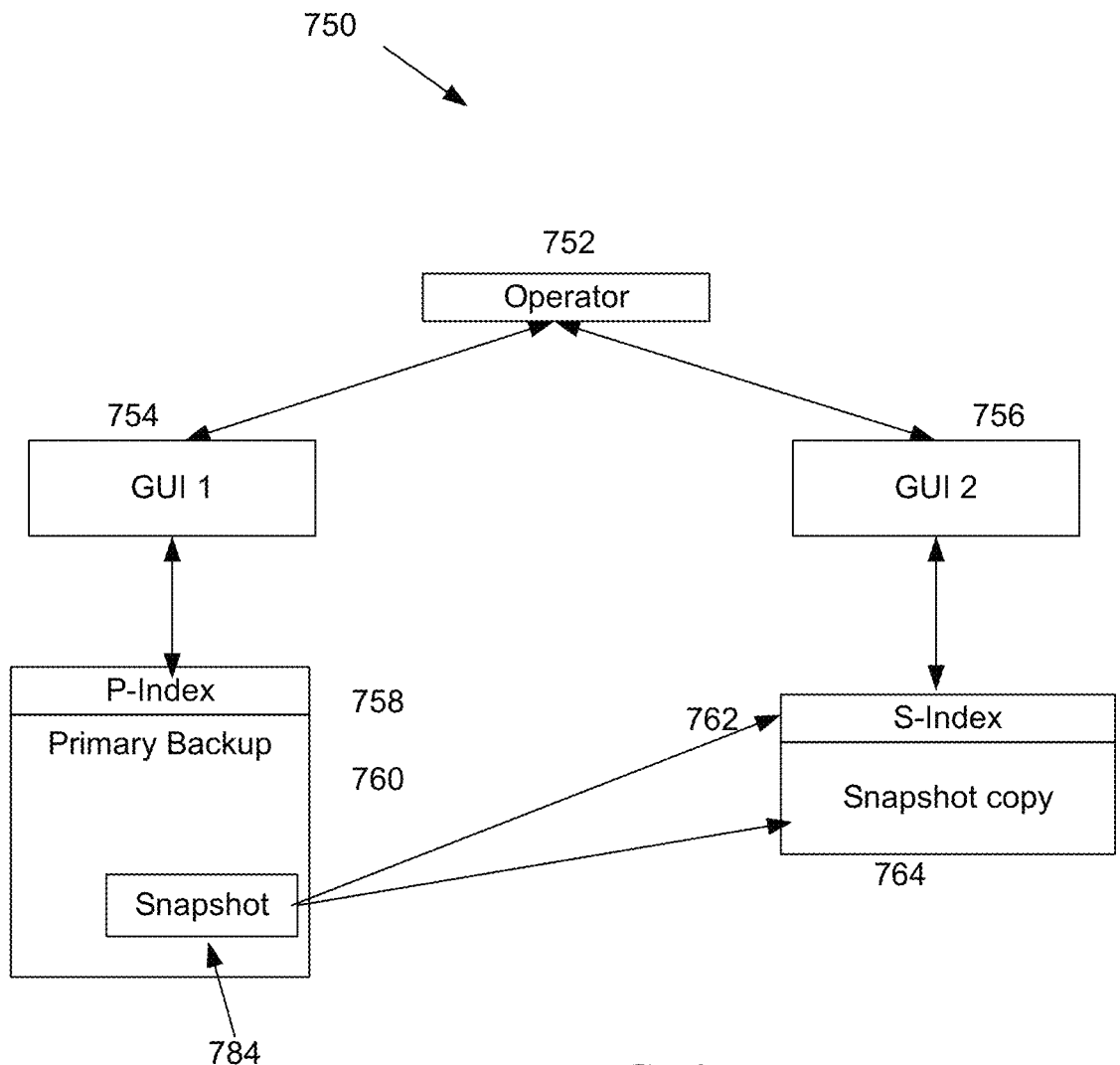
FIG. 6 is a block diagram representation of a data restoration operation using S-index and P-index tables.

FIG. 6 is block diagram depiction of the operation 750 of data restoration when backups are performed in system 500 of FIG. 5. The operation 750 may be executed by a human operator browsing for a certain file, or by a software agent looking up backed up files while performing a search operation. An operator 752 can access, via GUI1 754, files stored in a primary backup 760 that includes a snapshot 784 within which the file that the operator 752 is looking for may be located. The operation 750 may use the P-index 758 corresponding to the primary backup 760 to obtain a listing of all files stored in the primary backup 760.

When the operation 750 finds the snapshot 784 during the search operation, the operation 750 may either notify the operator 752 that data having another backup format as found and request further command by the operator 752 about how to browse the snapshot 784. Alternatively, the operation 750 may also launch a browsing operation for the snapshot 784. A second GUI window 756 may be launched for the operator 752 to browse through the files in the snapshot 784 using the corresponding S-index 762. The operation 750 may "stage" the snapshot 784 into a second copy 764 that is used by the GUI2 756 for browsing by the operator 752.

While, as described above, the operation 750 enables restoration and browsing of files stored in multiple backup formats, the presence of multiple backup files (e.g., multiple snapshots 784) or nested backup files in different formats may make the process of file browsing and producing results of search queries cumbersome to the operator 752 because the operator 752 may need to interact with multiple GUIs 754, 756, etc. each of which having a different format and menu structure.

Figure 7:
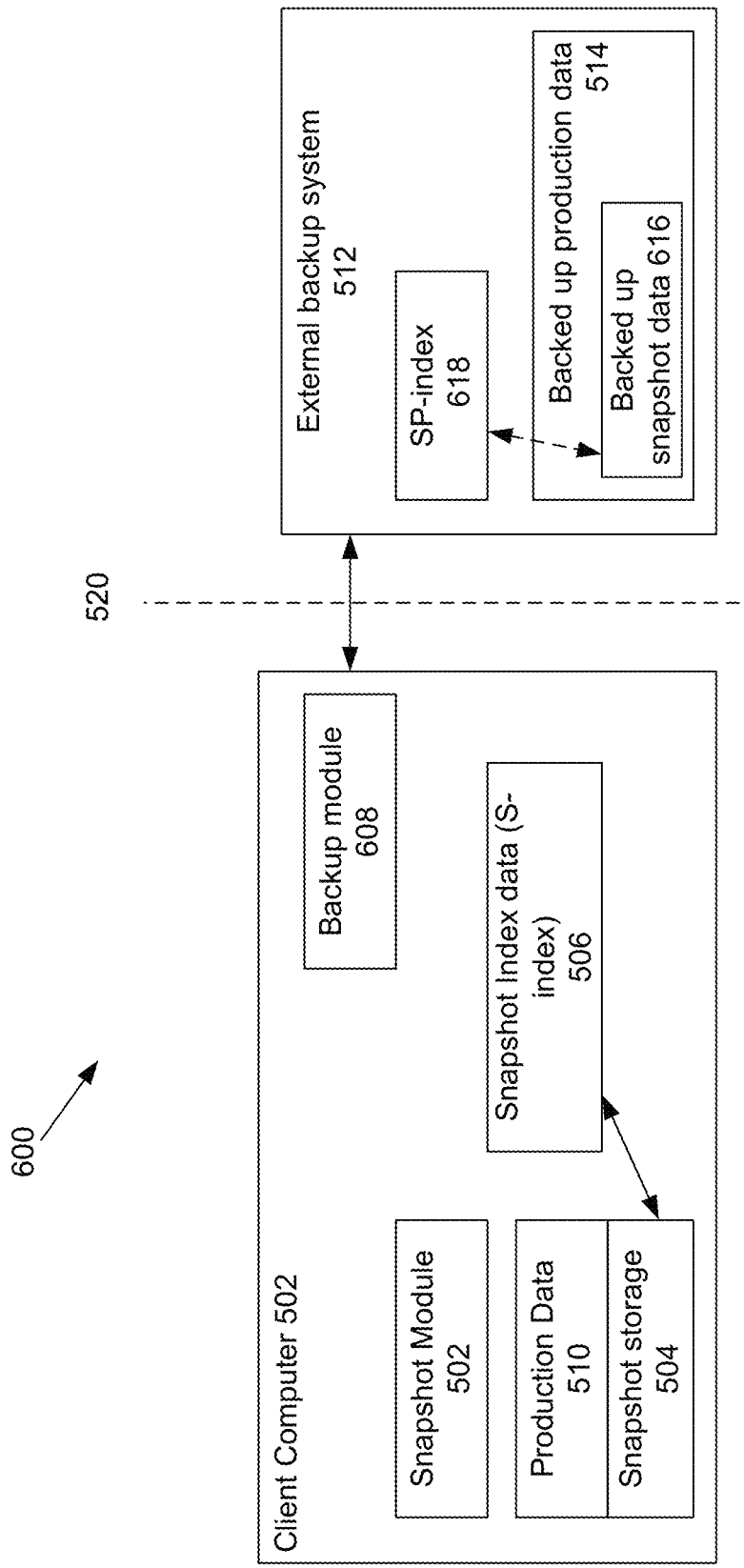
FIG. 7 is a block diagram representation of a backup system that uses a single master index table (SP-index) for data backup/restoration.

Thus, as an alternative, FIG. 7 depicts a system 600 in which data is backed up using a single index multiple backup formats to permit (among other things) easier browsing/searching. Compared to system 500 depicted in FIG. 5, the system 600 includes a backup module 608 that creates an SP-index 618 during a backup operation. The SP-index may contain a single, master table that provides a catalog of files stored in backed up production data 514, and backed up snapshot data 616 that may be included within the data 514.

During a backup operation, when transferring data from the client computer 502, including production data 510 and data in other backup formats, such as snapshot storage 504, the backup module 608 may create, or facilitate creation of, a single master index table called SP-index table. The SP-index table, described in greater detail below, may include entries corresponding to data items such as files and e-mails being backed up to the backed up production data 514, which also includes backed up snapshot data 616. In some implementations, during data transfer to the external backup system 512, the backup module 608 may determine that a next block of data being backed up corresponds to a backup archive in another format (e.g., a zipped file or S-indexed snapshot data). Upon this determination, the backup module 608 may use the corresponding indexes, e.g., S-index or zip index, to populate entries within the SP-index with information about what files are included in the backup archive of another format and how these files can be accessed only using the entry in the SP-index. Alternatively, in some embodiments, the task of building the SP-index may be performed at a computer running the above-described media agent. The SP-index may include data regarding all non-production copies, and may be normalized to permit access and display by the single GUI.

Figure 8:
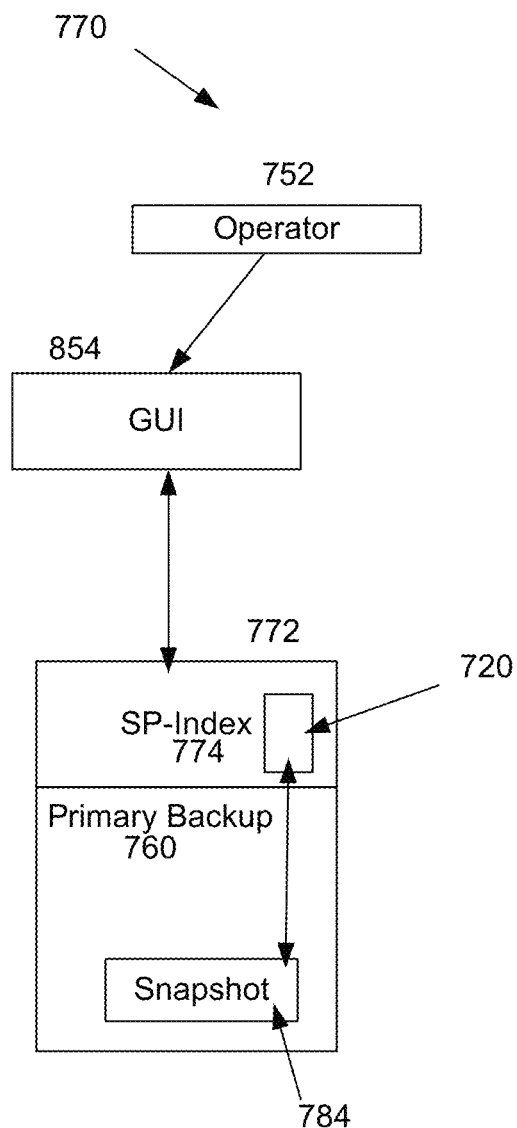
FIG. 8 is a block diagram representation of a data restoration operation using an SP-index table.

FIG. 8 is a block diagram depiction of an operation 770 that uses a single, master index, called SP-index 774, during data restoration. The system presents a single GUI 854 to the operator 752. To enable file search or file browsing by the operator 752, the operation 770 consults a single, master index table, the SP-index 774 that includes entries for data items stored in a different backup format (entries 720). The data 772 being used by the operation 770 includes primary backup data 760, which includes backup data in a different storage format (e.g., snapshot data 784) and the SP-index 774. In some implementations, data 772 may be stored at a backup or secondary storage system. In some implementations, data 772 may be split into a first portion (e.g., primary backup 760) that is stored on the backup storage media (e.g., a tape drive or a disk array) and a second portion (e.g., SP-index 774) stored on a computer running a media agent.

Using GUI 854, the operation 770 may present a catalog of data items listed in the SP-index 774 to the operator 752. Because the SP-index 774 is generated by listing all files, regardless of their backup format, the single GUI 854 advantageously avoids the need for multiple GUIs for the operator 752 to browse/search through the backed up data items.

Figure 9:
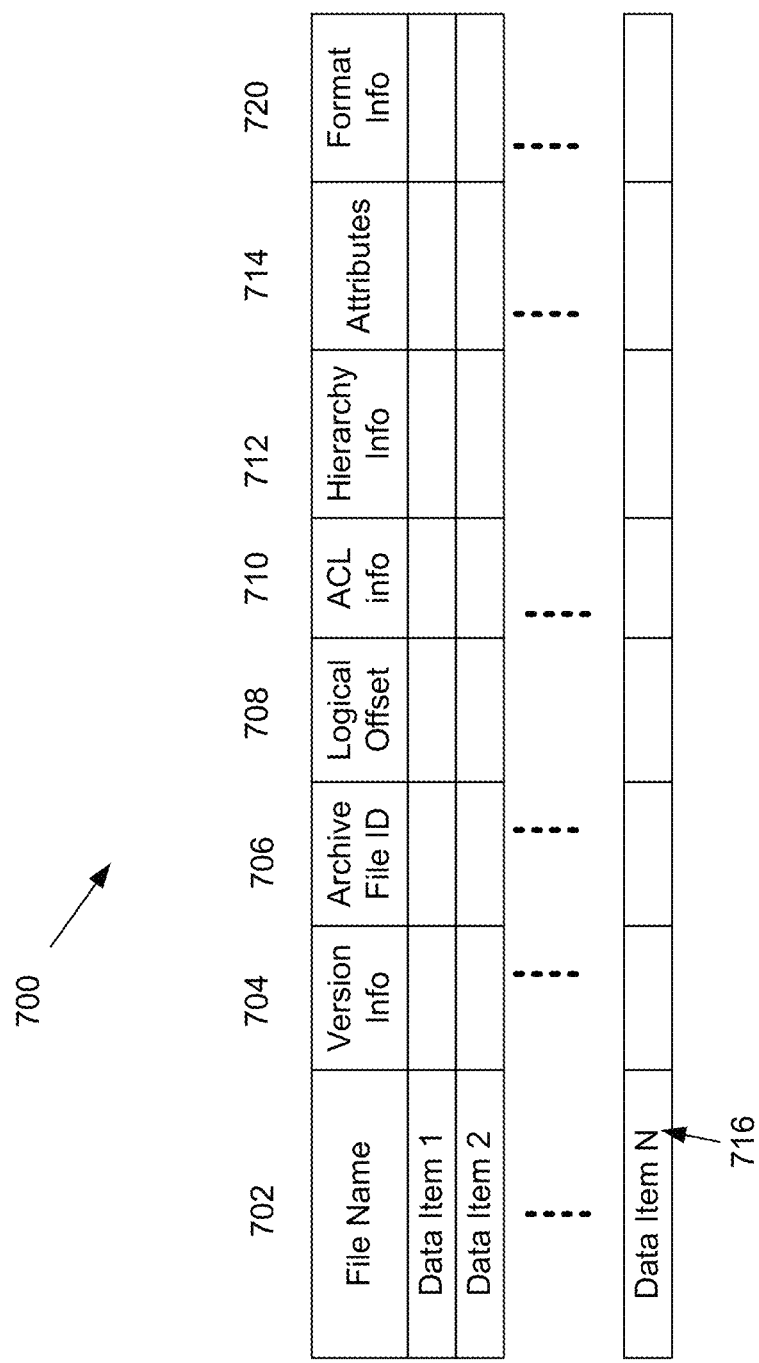
FIG. 9 is a block diagram representation of an SP-index table.

FIG. 9 depicts an example master index table (SP-index table) 700. While the depicted example 700 lists data items as rows of a table, with various attributes associated with the data items arranged in columns, this representation is for simplicity of explanation only. Various data organization techniques or data structures may be used in various embodiments. For example, in some implementations, the table may be represented with data items organized in columns and attributes organized in rows.

The table 700 may include the following columns. The column 702 may list various data items 716 for which indexing information is included in table 700. The data items may be, e.g., files, individual e-mails, or other logically independent data in which a user may be interested. In some implementations, the same data item may be listed twice due to its inclusion in multiple backup formats (e.g., once in a first backup format such as a zip folder, and once in a second backup format such as the backup format used by the external backup storage system).

The table 700 may include a column 704 in which version information associated with each data item may be listed. In column 706, archive file identification may be listed (e.g. a magnetic tape ID or GUID). In column 708, a logical offset to the data item, within the listed archive file, may be provided (e.g. a tape offset value). In column 710, an Access Control List (ACL) may be provided listing which users are authorized to access the corresponding data items. In column 712, hierarchy information for the data item may be provided. In column 714, attributes such as file size, last modified, creation date, etc. may be listed.

The format information column 720 may provide additional information about data items that are stored in multiple backup formats. In some implementations, when a data items is backed up from a primary location (e.g., production data) to a backup storage system, the format info column 720 may not include any entry, or may simply include a value (e.g., zero), indicating that the data item is stored in the backup storage using traditional indexing. For a data item that is stored in the backup storage as being a part of data stored in another backup format, the column 720 may provide additional information about the level of nesting of backup formats, which backup formats are used, where to locate the data item within the archive, and so on.

In some implementations, the archive file identification column 706 may indicate whether the data item is stored in a multiple backup format. For example, archive file IDs in a certain range may indicate that the data item is available in a zip file stored using the primary data backup format.

In some implementations, the table 700 may be organized in a format that is very similar to the P-index format used by the backup and restore operations. This can advantageously simplify the implementation of GUI 854 (FIG. 8), because GUI 854 may look and feel very similar to GUI 754 (FIG. 6). The entries in the table 700 that provide the enhanced information about backup format may be grouped and appended to the primary index entries. In some implementations, for a data item in a snapshot that is backed up on the backup storage system, the format info 720 may include a unique identification of a piece of data storage media (e.g. tape GUID), unique ID of the snapshot (e.g., a time stamp), and a logical offset to the particular data item within that snapshot. The format info 720 may also include information about whether the data item can be fully recovered by itself, or whether the data item is a "diff" entry in a snapshot and a full recovery of the data item requires access to additional data items. The format info 720 may include additional information about the base file from which this diff data item can be recovered. Alternatively, this information may be listed in the hierarchy info column 712. Further details may be found in the assignee's U.S. application Ser. No. 12/979, 101, filed Dec. 27, 2011, entitled SYSTEMS AND METHODS FOR PERFORMING DATA MANAGEMENT OPERATIONS USING SNAPSHOTS.

One of skill in the art will appreciate that the techniques described herein can be advantageously used to manage snapshot operations on a client computer by backing up the snapshots to a secondary backup system such as a tape drive, without sacrificing the ease and efficiency of restoration. After a snapshot is taken, at some later time, the snapshot may be moved to a tape. As a part of moving to tape, an SP-index can be created. The SP-index table can be used to browse data items stored within the snapshot while the snapshot is stored on tape. In some implementations, when a snapshot is created, an associated handle is created and stored in a central database. At some later time, a media agent may write the snapshot to a tape. The snapshot can be taken and made available for read/write access only to a pre-identified set of media agents from all media agents that have access to the tape drive. During the snapshot generation, no S-index is generated, thereby reducing the use of CPU cycles during the snapshot operation.

In conventional systems, when a computer went down, the operator may be still able to access the S-index for the computer and look at the file names that were stored in snapshots on the computer. However, because the computer is inaccessible, the operator could not recover or read the actual data items listed in the S-index. In other words, when a computer broke down, the S-index for the snapshots stored on the computer had no (or minimal) value. By generating SP-indexes only for snapshots that are backed up on a secondary storage medium (e.g., a tape drive), the presently disclosed techniques optimally use computer resources to generate indexes that are useful in data recovery, even when the computer from which these indexes are generated has gone down.

Figure 10:
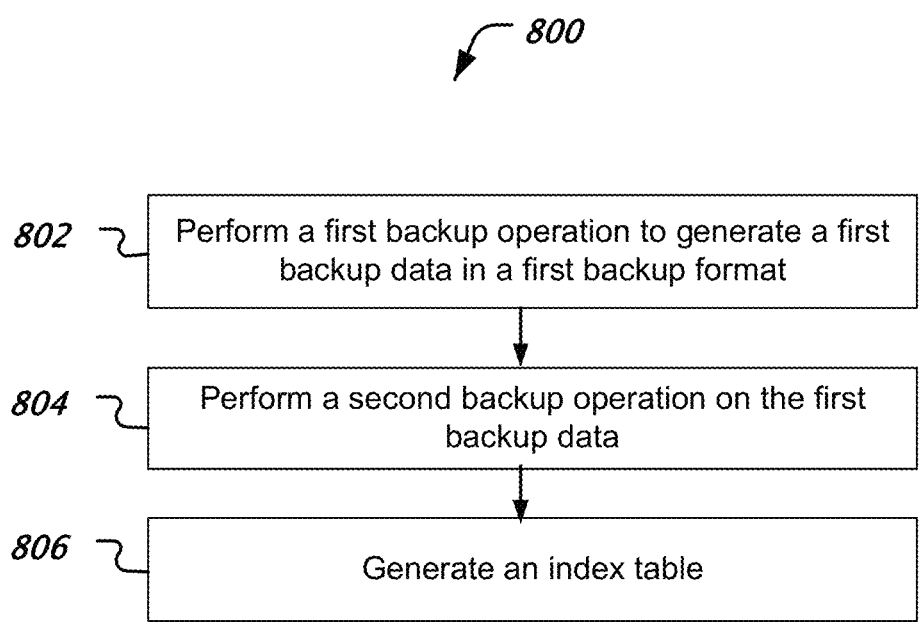
FIG. 10 is a flowchart representation of a data backup procedure that generates a single index for multiple backup formats.
Figure 11:
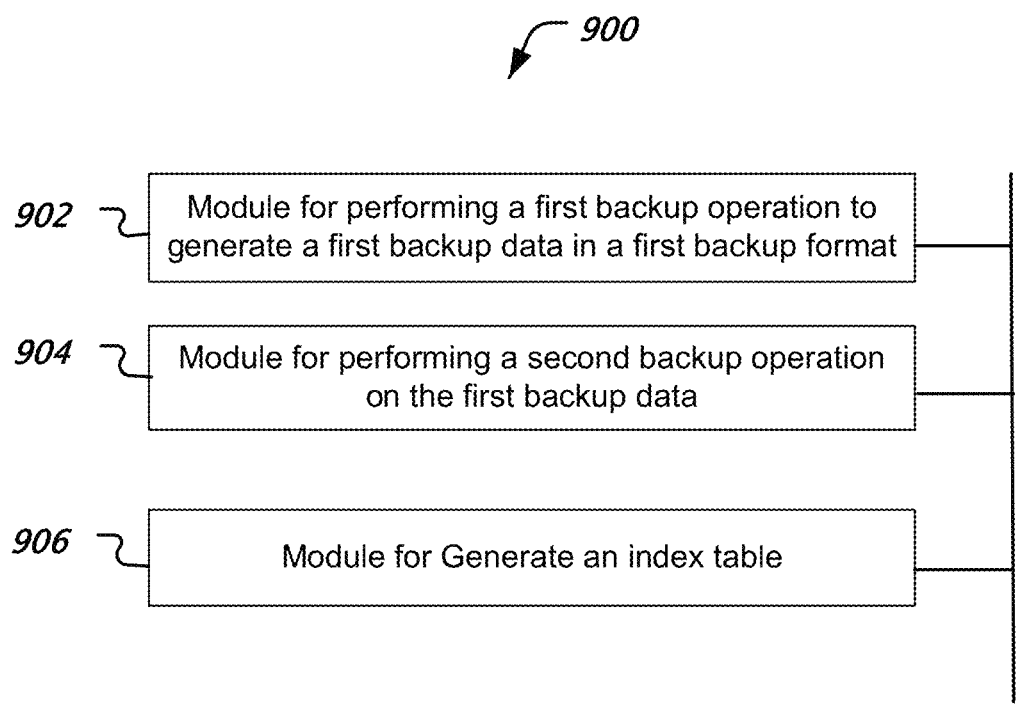
FIG. 11 is a block diagram representation of an apparatus for performing data backup by generating a single index for multiple backup formats.

FIG. 10 is a flowchart representation of a process 800 of backing up data. In various embodiments, the process 800 may be implemented at an operator computer, a media agent computer or another suitable computer communicatively connected to a backup storage system.

At 802, a first backup operation is performed to generate first backup data in a first backup format, without generating a corresponding index for browsing the first backup data in the first backup format. In some implementations, the first backup operation is performed by instructing a snapshot module to take a snapshot to generate the first backup data. Alternatively or additionally, the first backup operation includes taking a snapshot and the second backup operation comprises copying the snapshot to a secondary backup device.

The data items in the index table may include, e.g., a name or an identifier for the data item. For example, when the data item is a file, the index table entry may include either the file name or a unique ID associated with the file. As another illustrative example, the data item may corresponding to a particular e-mail item in a user's mail box and the data item may be listed using a unique identifier number or a unique identifier string for the e-mail item (e.g., from, to and a time stamp).

Various techniques may be used to identify that a data item belongs to the second backup format. For example, in some embodiments, a set of archive file IDs is pre-defined as indicating that the data item is stored in the second backup format. In some implementations, e.g., of 8K possible archive IDs (8×1024=8192), IDs in the range 2K to 4K (2048 to 4095 decimal) may be used to indicate that the corresponding data items are stored in a backed up snapshot, IDs in the range 4K to 6K (4096 to 6143 decimal) may be pre-defined to indicate data items backed up in the cloud backup format, and so on.

In some implementations, an additional entry may be used for each data item (e.g., an additional column in table 700 depicted in FIG. 9) to indicate the corresponding second backup format (if any). In some implementations, the entry for a data item may also include a pointer to a second index table that includes information about how to locate the data item within the backup data in the second storage format.

At 804, a second backup operation is performed on the first backup data in the first backup format to generate a second backup data in a second backup format.

At 806, an index table comprising entries for one or more data items from the first backup data stored in the second backup data in the second backup format is generated. Each entry including first access information for a data item to allow access to the data item in the second backup data and second access information to allow access to the data item in the first backup data, thereby allowing direct access to the data item based on information from the index table.

Figure 12:
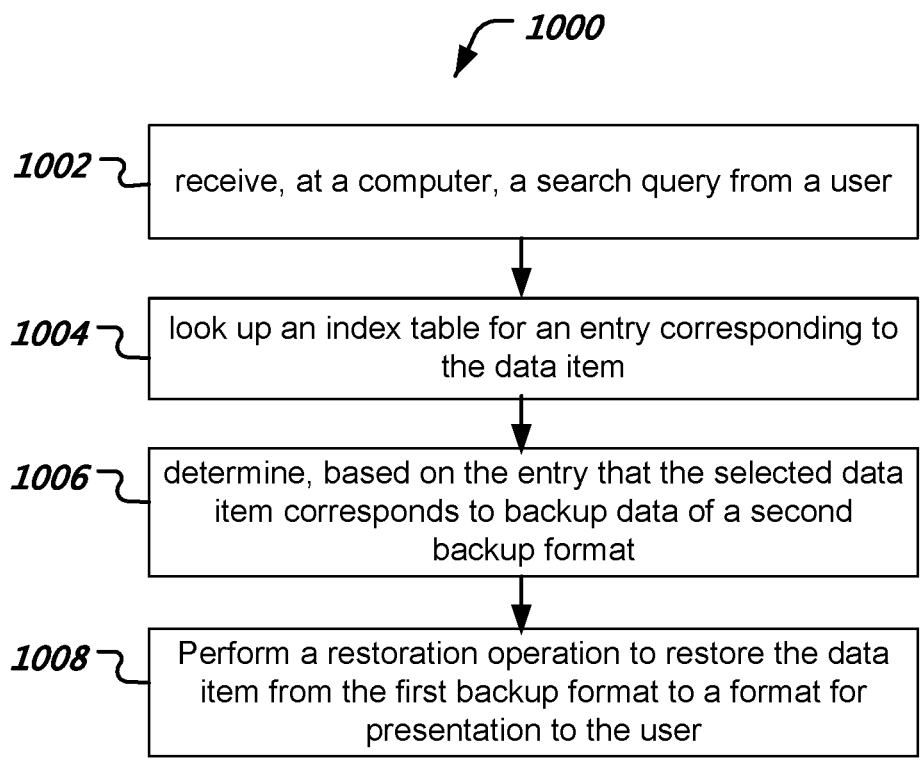
FIG. 12 is a flowchart representation of a data restoration procedure that uses a single index for multiple backup formats.

FIG. 12 is a flowchart representation of a method 1000 of enabling browsing of data items that are stored in a backup storage system in a first backup format. The backup format may, e.g., be a function of the physical medium on which the backed up data is stored (tape drive, disk array, cloud storage, etc.).

At 1002, a search query from a user is received at a computer. The search query is for a data item stored in the backup storage system. The search query may be received through an operator interface at a system administrator's computer or may be received from a user computer from which the data item was originally backed up. In various embodiments, the backup storage system may include a tape drive, a disk array or a cloud-based storage system, and so on.

At 1004, the process 1000 looks up an entry corresponding to the data item in an index table. In some implementations, e.g., index table 700, disclosed previously, the index file includes an archive file identification number that is pre-associated with the second backup format.

At 1006, based on the entry, the process 1000 determines that the selected data item corresponds to backup data of a second backup format.

At 1008, the process 1000 performs a restoration operation to restore the data item from the first backup format to a format for presentation to the user.

In some implementations, the process 1000 may perform the restoration operation by performing first and second data staging operations. In the first data staging operation, data from the first backup format is staged into the second backup format. The process 1000 stores the data for use by the second data staging operation. The second staging operation stages the data from the second backup format to a presentation format for the user.

As an illustrative example, in some implementations, snapshot data representing a state of files on a client computer may originally be stored on a tape drive. During restoration, the process of restoration may first stage the data from the tape format to a temporary storage space on a computer (e.g. on disk or in solid state memory). The conversion from the tape format to the temporary storage space may include, e.g., regenerating data by removing de-duplication. The restoration process may then convert the temporarily stored data into a presentation format suitable for the GUI used by the user. For example, the presentation format may enable the user to search file names using a search window, may provide an expandable file listing or provide a flat list of all files restored.

Figure 13:
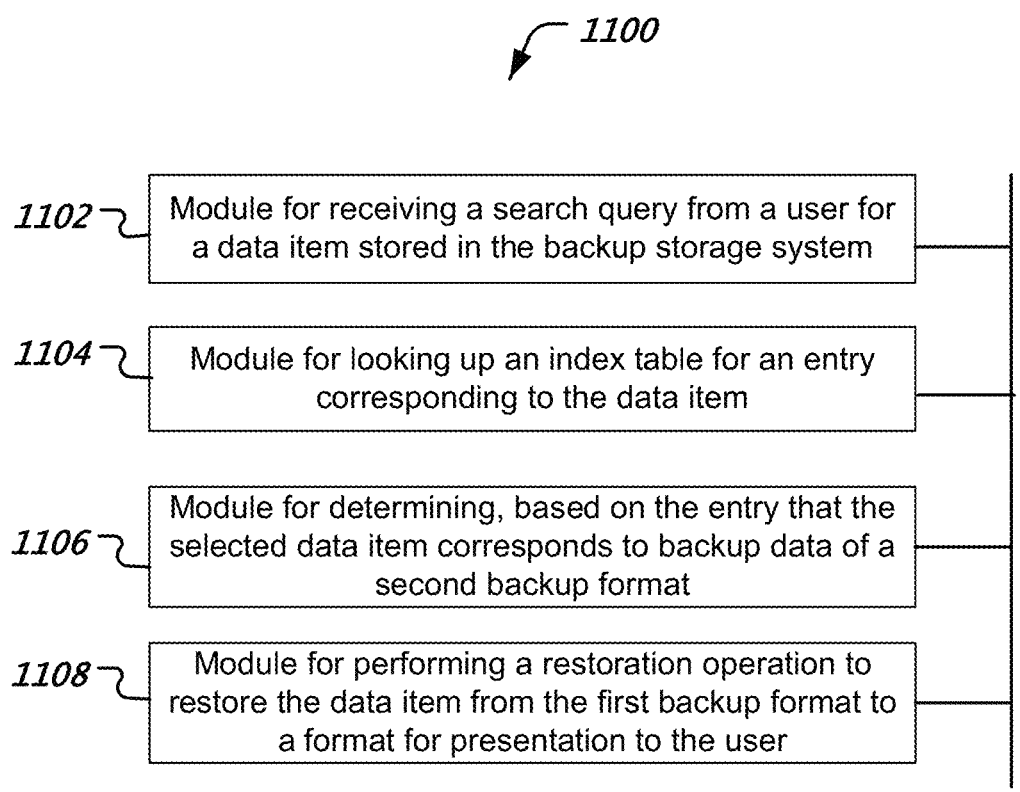
FIG. 13 is a block diagram representation of an apparatus for restoring data using a single index for multiple backup formats.

FIG. 13 is a block diagram representation of an apparatus 1100 for data restoration. The module 1102 is for receiving a search query from a user for a data item stored in the backup storage system. The module 1104 is for looking up an index table for an entry corresponding to the data item. The module 1106 is for determining, based on the entry that the selected data item corresponds to backup data of a second backup format. The module 1108 is for performing a restoration operation to restore the data item from the first backup format to a format for presentation to the user. The apparatus 1100 and modules 1102, 1104, 1106, and 1108 may be configured to implement some of the techniques disclosed in the present document.

Those of ordinary skill in the relevant art will appreciate from the detailed description above that several techniques are now disclosed for backing up and restoring data items that are stored in multiple nested backup formats. In one advantageous aspect, the disclosed technique can be used to restore data stored in multiple backup formats using a single index table or a single graphical user interface (GUI). Those of ordinary skill in the relevant art will also appreciate that the disclosed techniques can be used to provide search results to a single query for a data item in a backup storage even when the data item may be stored in one of many possible backup formats or may be stored in nested backup formats.

Conclusion

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. A computer-implemented method for facilitating browsing of data items stored in a backup or archive storage system, the method comprising:
   receiving, at a computing device comprising processors and a memory, a search query from a user for a data item stored in the storage system,
      wherein the data item is archived and stored in a first data format associated with archiving the data item in the storage system;
   querying an index data structure of the storage system for an entry corresponding to the data item, wherein the index data structure includes information regarding data stored within the storage system, and wherein the entry in the index data structure provides information about nesting of data formats associated with the data item stored in the storage system;
   determining, based on the entry in the index data structure, that the data item has a second data format associated with a type of secondary copy of the data item, wherein the second data format is nested within the first data format which is associated with archiving; and
   performing, by the computing device, a restoration operation that restores the data item from the first data format to a third data format that permits presentation of at least a portion of the data item to the user,
   wherein the restoration operation includes:
   a first data staging operation in which the data item in the first data format is staged into the second data format and stored at the computing device,
   and a second data staging operation in which the data item in the second data format at the computing device is staged to the third data format for presentation to the user, and
   wherein the first data format, the second data format, and the third data format are different from each other.

2. The computer-implemented method of claim 1, wherein the entry in the index data structure includes an archive file identification number that is pre-associated with the first data format, wherein the first data format is an archive format not usable by a user's computing device without least one of: decryption, decompression, and conversion from a de-duplicated format.

3. The computer-implemented method of claim 1, wherein the first data staging operation temporarily stages the data item into the second format at the computing device, and wherein staging of the second format to the third format for presentation comprises generating a directory tree for the data item.

4. The computer-implemented method of claim 1, wherein the first format is a tape drive format, the second format is a backup format, and the third format is a data presentation format.

5. The computer-implemented method of claim 1, wherein the second format associated is a snapshot format.

6. The computer-implemented method of claim 1, wherein the entry in the index data structure includes an archive file identification number that is pre-associated with an archive file format.

7. The computer-implemented method of claim 1, wherein the second staging operation in which the data item is staged to a presentation format generates an expandable listing of file names associated with the data item.

8. A data storage system configured for facilitating browsing of data items stored in the system,
   comprising processors and computer memory configured to:
   receive a search query from a user for a data item stored in the data storage system,
      wherein the data item is archived and stored in a first data format that is associated with archiving the data item in the data storage system;
   query an index data structure of the data storage system for an entry corresponding to the data item, wherein the index data structure includes information regarding data stored within the data storage system, and wherein the entry in the index data structure provides information about nesting of data formats associated with the data item stored in the storage system;
   determine, based on the entry in the index data structure, that the data item has a second data format associated with a type of secondary copy of the data item, wherein the second data format is nested within the first data format which is associated with archiving of the data item; and perform a restoration operation that restores the data item from the first data format to a third data format that permits presentation of at least a portion of the data item to the user, wherein the restoration operation includes:
  a first data staging operation in which the data item in the first data format is staged into the second data format and stored at a client computing device,
  and a second data staging operation in which the data item in the second data format at the client computing device is staged to the third data format for presentation to the user,
  wherein the first data format, the second data format, and the third data format are different from each other.

9. The system of claim 8, wherein the entry in the index data structure includes an archive file identification number that is pre-associated with the first data format, wherein the first data format is not usable by the client computing device without prior processing, wherein the prior processing includes at least one of: decryption, decompression, and conversion from a de-duplicated format.

10. The system of claim 8, wherein the second format comprises a snapshot format.

11. The system of claim 8, wherein the first data staging operation temporarily stages the data item into the second format at the client computing device, and wherein staging of the second format to the third format for presentation comprises generating a directory tree for the data item.

12. The system of claim 8, wherein the first format is a tape drive format and the third format is a data presentation format.

13. The system of claim 8, wherein the second format associated with a type of secondary copy of the data item is a snapshot format.

14. The system of claim 8, wherein the system further includes at leat one of: a tape drive and a disk array as storage devices.

15. The system of claim 8, wherein one or more storage devices in which the data item is archived and stored in the first data format are part of a cloud-based storage system.

16. The system of claim 8, wherein the second staging operation in which the data item is staged to a presentation format generates an expandable listing of file names associated with the data item.

* * * * *